United States Patent
Barron et al.

(10) Patent No.: US 9,892,496 B2
(45) Date of Patent: Feb. 13, 2018

(54) EDGE-AWARE BILATERAL IMAGE PROCESSING

(71) Applicant: Google Inc., Mountain View, CA (US)

(72) Inventors: Jonathan Tilton Barron, Alameda, CA (US); Benjamin Michael Poole, Mountain View, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 15/344,501

(22) Filed: Nov. 4, 2016

(65) Prior Publication Data

US 2017/0132769 A1 May 11, 2017

Related U.S. Application Data

(60) Provisional application No. 62/251,608, filed on Nov. 5, 2015.

(51) Int. Cl.
G06K 9/00 (2006.01)
G06T 5/20 (2006.01)
(Continued)

(52) U.S. Cl.
CPC ............... *G06T 5/20* (2013.01); *G06K 9/42* (2013.01); *G06K 9/4652* (2013.01);
(Continued)

(58) Field of Classification Search
CPC .......... G06T 5/20; G06T 3/4076; G06T 5/50; G06T 2207/20028; G06K 9/42; G06K 9/4652; G06K 9/6215
See application file for complete search history.

(56) References Cited

U.S. PATENT DOCUMENTS

| 5,729,691 A | 3/1998 | Agarwal |
| 5,986,668 A | 11/1999 | Szeliski et al. |

(Continued)

FOREIGN PATENT DOCUMENTS

| WO | 2006016971 A1 | 2/2006 |
| WO | 2007017834 A2 | 2/2007 |
| WO | 2013078479 A1 | 5/2013 |

OTHER PUBLICATIONS

Tao, Michael et al., SimpleFlow: a Non-iterative, Sublinear Optical Flow Algorithm, Computer Graphics Forum, May 2012, vol. 31 No. 2pt1.

(Continued)

*Primary Examiner* — Jonathan S Lee
(74) *Attorney, Agent, or Firm* — McDonnell, Boehnen, Hulbert & Berghoff LLP

(57) ABSTRACT

Example embodiments may allow for the efficient, edge-preserving filtering, upsampling, or other processing of image data with respect to a reference image. A cost-minimization problem to generate an output image from the input array is mapped onto regularly-spaced vertices in a multidimensional vertex space. This mapping is based on an association between pixels of the reference image and the vertices, and between elements of the input array and the pixels of the reference image. The problem is them solved to determine vertex disparity values for each of the vertices. Pixels of the output image can be determined based on determined vertex disparity values for respective one or more vertices associated with each of the pixels. This fast, efficient image processing method can be used to enable edge-preserving image upsampling, image colorization, semantic segmentation of image contents, image filtering or de-noising, or other applications.

20 Claims, 7 Drawing Sheets

(51) Int. Cl.

| | |
|---|---|
| G06K 9/46 | (2006.01) |
| G06K 9/62 | (2006.01) |
| G06K 9/42 | (2006.01) |
| G06T 5/50 | (2006.01) |
| G06T 3/40 | (2006.01) |

(52) U.S. Cl.
CPC .......... *G06K 9/6215* (2013.01); *G06T 3/4076* (2013.01); *G06T 5/50* (2013.01); *G06T 2207/20028* (2013.01)

(56) References Cited

U.S. PATENT DOCUMENTS

| | | | |
|---|---|---|---|
| 5,987,164 | A | 11/1999 | Szeliski et al. |
| 6,009,190 | A | 12/1999 | Szeliki et al. |
| 6,018,349 | A | 1/2000 | Szeliski et al. |
| 6,043,909 | A | 3/2000 | Holub |
| 6,044,181 | A | 3/2000 | Szeliski et al. |
| 6,046,763 | A | 4/2000 | Roy |
| 6,075,905 | A | 6/2000 | Herman et al. |
| 6,097,854 | A | 8/2000 | Szeliski et al. |
| 6,157,747 | A | 12/2000 | Szeliski et al. |
| 6,411,953 | B1 | 6/2002 | Ganapathy et al. |
| 7,113,649 | B2 | 9/2006 | Gindele |
| 7,200,264 | B2 | 4/2007 | Hubel et al. |
| 7,248,968 | B2 | 7/2007 | Reid |
| 7,587,099 | B2 | 9/2009 | Szeliski et al. |
| 8,149,459 | B2 | 4/2012 | Mestha et al. |
| 8,155,454 | B2 | 4/2012 | Raveendran |
| 8,179,402 | B2 | 5/2012 | Ten |
| 8,253,752 | B2 | 8/2012 | Raveendran |
| 8,275,195 | B2 | 9/2012 | Francini et al. |
| 8,588,551 | B2 | 11/2013 | Joshi et al. |
| 8,964,060 | B2 | 2/2015 | Levoy et al. |
| 8,988,536 | B2 | 3/2015 | Park et al. |
| 9,007,484 | B2 | 4/2015 | Zhang et al. |
| 9,336,582 | B1 | 5/2016 | Barron |
| 9,571,819 | B1* | 2/2017 | Barron ............... H04N 13/0239 |
| 9,736,451 | B1* | 8/2017 | Barron ............... H04N 13/0022 |
| 2003/0194125 | A1 | 10/2003 | Hubei et al. |
| 2004/0075659 | A1* | 4/2004 | Taubin .................... G06T 17/20 345/428 |
| 2005/0254073 | A1* | 11/2005 | Braun .................. H04N 1/6022 358/1.9 |
| 2010/0321539 | A1 | 12/2010 | Ito |
| 2012/0213327 | A1 | 8/2012 | Boas |
| 2014/0211048 | A1 | 7/2014 | Kolli |
| 2014/0241643 | A1 | 8/2014 | Leitao |
| 2015/0104112 | A1 | 4/2015 | Levi |

OTHER PUBLICATIONS

Krahenbuhl, Philipp and Koltun, Vladlen, Efficient Nonlocal Regularization for Optical Flow, Computer Vision—ECCV 2012, Oct. 2012.
Xiao, Jiangjian et al., Bilateral Filtering-based Optical Flow Estimation with Occlusion Detection, Computer Vision—ECCV 2006, May 2012.
Adams, Andrew et al., Fast High-Dimensional Filtering Using the Permutohedral Lattice, Computer Graphics Forum, May 2010, vol. 29 No. 2.
Scharstein, Daniel and Szeliski, Righard, A taxonomy and evaluation of dense two-frame stereo correspondence algorithms, International Journal of Computer Vision, Apr. 2002, vol. 47 No. 1-3.
Bao, Linchao et al., Fast Edge-Preserving PatchMatch for Large Displacement Optical Flow, IEEE Transactions on Image Processing, 2014.
Alahi, Alexandre et al., "Freak: Fast Retina Keypoint", IEEE Conference on Computer Vision and Pattern Recognition (CVPR), 2012, pp. 510-517.
Barnard, Kobus, "Improvements to Gamut Mapping Colour Constancy Algorithms," In Computer Vision—ECCV 2000, pp. 390-403, Springer Berlin Heidelberg.
Barnard, Kobus et al., "A Comparison of Computational Color Constancy Algorithms—Part II: Experiments With Image Data," IEEE Transactions on Image Processing, 2002, pp. 985-996, vol. 11, No. 9.
Barron, Jonathan T. et al., "Volumetric Semantic Segmentation using Pyramid Context Features," IEEE International Conference on Computer Vision (ICCV), 2013, pp. 3448-3455.
Barrow H. G. et al. "Recovering Intrinsic Scene Characteristics From Images," Computer Vision Systems, 1978, pp. 3-26, A. Hanson & E. Riseman (eds.), New York: Academic Press.
Belongie, Serge et al., "Shape Context: A new descriptor for shape matching and object recognition," In NIPS, 2000, 7 pages, vol. 2.
Berens et al., "Log-opponent chromatically coding of colour space," IEEE, 2000, pp. 206-211.
Berg, Alexander C. et al., "Geometric Blur for Template Matching," Proceedings of the 2001 IEEE Computer Society conference on Computer Vision and Pattern Recognition, (CVPR 2001), IEEE, 2001, 8 pages, vol. 1.
Berwick et al., "A Chromaticity Space for Specularity, Illumination Color- and Illumination Pose-Invariant 3-D Object Recognition," Sixth International Conference on Computer Vision, 1998, pp. 165-170.
Bianco, Simone et al., "Color Constancy Using Faces," IEEE Conference on Computer Vision and Pattern Recognition (CVPR), IEEE, 2012, pp. 65-72.
Brainard, David H. et al., "Analysis of the retinex theory of color vision," J. Opt. Soc. Am. A, Oct. 1986, pp. 1651-1661, vol. 3, No. 10.
Buchsbaum, G., "A spatial processor model for object colour perception," Journal of the Franklin institute, 1980, pp. 1-26, vol. 310, No. 1.
Chakrabarti, Ayan, et al., "Color constancy with spatio-spectral statistics," IEEE Transactions on Pattern Analysis and Machine Intelligence, 2012, pp. 1509-1519, vol. 34, No. 8.
Cheng, Dongliang et al., "Illuminant Estimation for Color Constancy: Why spatial-domain methods work and the role of the color distribution," JOSA A, 2014, pp. 1049-1058, vol. 31, No. 5.
Farbman, Zeev et al., "Convolution Pyramids," ACM Trans. Graph., 2011, pp. 1-9, vol. 30, No. 6.
Finlayson, Graham D., "Corrected-Moment Illuminant Estimation," IEEE International Conference on Computer Vision (ICCV), IEEE, 2013, pp. 1904-1911.
Finlayson et al., "Shades of Gray and Colour Constancy," IS&T/SID Twelfth Color Imaging Conference, 2004, pp. 37-41.
Gehler, Peter V., et al., "Bayesian Color Constancy Revisited," IEEE Conference on Computer Vision and Pattern Recognition, CVPR 2008, IEEE, 2008, pp. 1-8.
Gijsenij, Arjan et al., "Color Constancy Using Natural Image Statistics and Scene Semantics," IEEE Transactions on Pattern Analysis and Machine Intelligence, 2011, pp. 687-698, vol. 33, No. 4.
Gijsenij, Arjan et al., "Computational Color Constancy: Survey and Experiments," IEEE Transactions on Image Processing, 2010, pp. 2475-2489, vol. 20, No. 9.
Gilchrist, Alan, Seeing Black and White, Oxford University Press, 2006, all pages.
Joze, Hamid Reza Vaezi et al., "The Role of Bright Pixels in Illumination Estimation." In Color and Imaging Conference, Society for Imaging Science and Technology, 2012, pp. 41-46, vol. 2012, No. 1.
Rowse, Darren, "Introduction to White Balance," Digital Photography School, 2014, 5 pages.
Shi, Lilong et al., "Shi's Re-processed Version of the Gehler Color Constancy Dataset of 568 Images," Simon Fraser University (2010), http://www.cs.sfu.ca/~colour/data, 3 pages.
Taskar, Ben et al., "Learning Structured Prediction Models: A Large Margin Approach," In Proceedings of the 22nd International Conference on Machine Learning, ACM, 2005, 235 pages.
Van De Weijer, Joost et al., "Edge-Based Color Constancy," IEEE Transactions on Image Processing, 2007, pp. 2207-2214, vol. 16, No. 9.
Barron et al., "Fast Bilateral-Space Stereo for Synthetic Defocus," CVPR, 2015, 9 pages.

(56) References Cited

OTHER PUBLICATIONS

Chen, S. et al., "Real-time edge-aware image processing with the bilateral grid," ACM SIGGRAPH, 2007, pp. 1-9.
Esme, Biglin, "Kalman Filter for Dummies," Bilgin's Blog, Mar. 2009, 5 pages, http://bilgin.esme.org/BitsBytes/KalmanFilterforDummies.aspx.
Farnebäck, Gunnar, "Polynomial Expansion for Orientation and Motion Estimation," Linköping Studies in Science and Technology, Dissertations, Nov. 2002, pp. 1-182, http:://lmi.bwh.harvard.edu/papers/pdfs/gunnar/farneback02.pdf.
Gastal et al., Domain transform for edge-aware image and video processing. SIGGRAPH, 2011, 11 pages.
Gaussian, "The Exponential Family of Distributions," last accessed May 26, 2015, 13 pages, http://ww.cs.columbia.edu/~jebara/4771/tutorials/lecture12.pdf.
Kalman filter, Wikipedia, http://en.wikipedia.org/wiki/Kalman_filter#Information_filter, last accessed May 26, 2015, 26 pages.
Lewis, J.P., "Fast Normalized Cross-Correlation," Expanded Version of paper from Vision Interface, 1995, 7 pages.
Tomasi et al., "Bilateral filtering for gray and color images," Proceedings of the 1998 IEEE International Conference on Computer Vision (ICCV) Bombay, India, 1998, 8 pages.
Welch et al., "An Introduction to the Kalman Filter, Course 8," SIGGRAPH, 2001, pp. 1-81.
Barron, Jonathan T., "Convolutional Color Constancy," 2015 IEEE International Conference on Computer Vision, 2015, pp. 379-387.
Bianco et al., "Computational Color Constancy," 3rd European Workshop on Visual Information Processing, IEEE, 2011, pp. 1-7.
Finlayson et al., "Color constancy at a pixel," Journal of the Optical Society of America, 2001, pp. 253-264, vol. 18, No. 2.
International Searching Authority, International Search Report and Written Opinion dated Jul. 28, 2016, issued in connection with International Patent Application No. PCT/US2016/027031, filed on Apr. 12, 2016, 13 pages.
Notice of Allowance dated Feb. 8, 2016, issued in connection with U.S. Appl. No. 14/689,246, filed Apr. 17, 2015, 10 pages.
Notice of Allowance dated Feb. 24, 2016, issued in connection with U.S. Appl. No. 14/720,747, filed May 23, 2015, 7 pages.
Ex Parte Quayle Action dated Dec. 30, 2015, issued in connection with U.S. Appl. No. 14/720,747, filed May 23, 2015, 6 pages.
International Searching Authority, International Search Report and Written Opinion dated Feb. 13, 2017, issued in connection with International Patent Application No. PCT/US2016/060733.

* cited by examiner

EDGE-AWARE BILATERAL IMAGE PROCESSING

CROSS-REFERENCE TO RELATED APPLICATION

This application claims priority to and incorporates by reference the content of U.S. Provisional Patent Application No. 62/251,608, filed Nov. 5, 2015.

BACKGROUND

It could be beneficial, when performing image processing on an image of a natural scene, to take into account the locations and boundaries of discrete people, animals, plants, objects, buildings, or other contents of such an image. Such image processing tasks could include filtering of the image data (e.g., to remove noise or artifacts), colorization of an image, determining information about contents of the image (e.g., a depth of each pixel in the image, a semantic category label assigned to each pixel in the image), or some other image processing tasks. For example, when colorizing an image, it could be beneficial to apply a small number of manually-specified color values to the rest of the object in order to generate a colorized version of the image. In another example, it may be beneficial to filter and/or upsample a depth map of an image (e.g., a depth map determined from a stereoscopic image pair, or generated by a depth sensor that is aligned with a camera or other image-generating apparatus). Such image processing tasks could be computationally intensive (e.g., requiring large amounts of time, memory, or other computational resources). It could be beneficial to develop improved methods of performing such image processing tasks.

SUMMARY

Images of natural scenes (e.g., images inside a building or images of an outdoor area) often include people, animals, buildings, plants, or other discrete objects. It can be beneficial to filter, upsample, or otherwise manipulate color information or other data related to an image in a manner that respects the boundaries of such objects within the image. For example, when colorizing an image, a person may manually specify colors of regions or objects within the image. These manually-specified colors could then be applied to adjacent regions of the image without crossing edges within the image. In another example, a low-resolution infrared image of a scene that corresponds to a visible-light image of the scene could be upsampled to generate a higher-resolution infrared image of the scene. This upsampling could be based on the visible-light image such that the upsampled infrared image is smooth within objects of the scene but may change abruptly across edges of objects within the scene. The ability to quickly filter, upsample, or otherwise manipulate such information in an edge-preserving manner may be beneficial in various other applications.

In a first aspect, a method includes: (i) obtaining, by a computing system, (1) a reference image that was captured by a camera device and (2) a target array, wherein the reference image includes a plurality of pixels that have respective pixel locations in the reference image and respective color variables, wherein the target array includes target values, and wherein the target values respectively correspond to the pixels of the reference image; (ii) associating, by the computing system, the pixels of the reference image with respective vertices in a vertex space, wherein the vertex space includes two spatial dimensions and a color-space dimension, wherein the association between the pixels of the reference image and the respective vertices is defined by an association matrix, wherein the association matrix includes a plurality of values of which fewer than half are non-zero; (iii) associating, by the computing system, the target values with the respective vertices with which the pixels of the reference image corresponding to the target values are associated; (iv) determining, by the computing system, a vertex cost matrix based on: (1) the association between the pixels of the reference image and the respective vertices, and (2) a degree of similarity between pairs of pixels of the reference image, wherein the degree of similarity between a particular pair of pixels of the reference image is related to a distance between the pixel locations of the particular pair of pixels in the reference image and a distance in the color-space dimension between the color variables of the particular pair of pixels of the reference image; (v) determining, by the computing system, respective vertex fit values for the vertices by solving a linear system defined by the vertex cost matrix and a vertex cost vector; and (vi) generating, by the computing system, a filtered output image, wherein the filtered output image includes pixels that respectively correspond to the pixels of the reference image, wherein generating the filtered output image includes using the determined vertex fit values of vertices that are associated with the pixels of the reference image as a basis to determine respective pixels of the filtered output image.

In a further aspect, a non-transitory computer readable medium has stored therein instructions executable by a computing system to cause the computing system to perform operations including: (i) obtaining (1) a reference image that was captured by a camera device and (2) a target array, wherein the reference image includes a plurality of pixels that have respective pixel locations in the reference image and respective color variables, wherein the target array includes target values, and wherein the target values respectively correspond to the pixels of the reference image; (ii) associating the pixels of the reference image with respective vertices in a vertex space, wherein the vertex space includes two spatial dimensions and a color-space dimension, wherein the association between the pixels of the reference image and the respective vertices is defined by an association matrix, wherein the association matrix includes a plurality of values of which fewer than half are non-zero; (iii) associating the target values with the respective vertices with which the pixels of the reference image corresponding to the target values are associated; (iv) determining a vertex cost matrix based on: (1) the association between the pixels of the reference image and the respective vertices, and (2) a degree of similarity between pairs of pixels of the reference image, wherein the degree of similarity between a particular pair of pixels of the reference image is related to a distance between the pixel locations of the particular pair of pixels in the reference image and a distance in the color-space dimension between the color variables of the particular pair of pixels of the reference image; (v) determining respective vertex fit values for the vertices by solving a linear system defined by the vertex cost matrix and a vertex cost vector; and (vi) generating a filtered output image, wherein the filtered output image includes pixels that respectively correspond to the pixels of the reference image, wherein generating the filtered output image includes using the determined vertex fit values of vertices that are associated with the pixels of the reference image as a basis to determine respective pixels of the filtered output image.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1A:
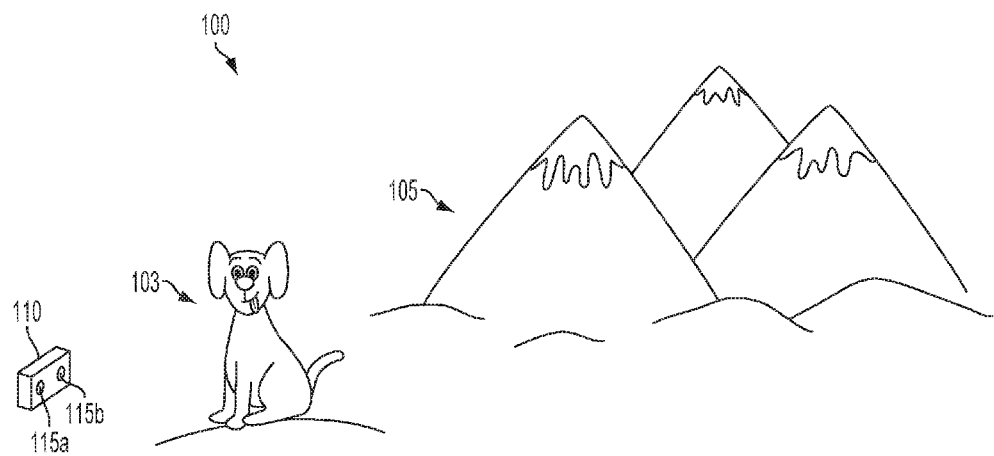
FIG. 1A depicts contents of an example scene being imaged by a device.

Examples of methods and systems are described herein. It should be understood that the words "exemplary," "example," and "illustrative," are used herein to mean "serving as an example, instance, or illustration." Any embodiment or feature described herein as "exemplary," "example," or "illustrative," is not necessarily to be construed as preferred or advantageous over other embodiments or features. Further, the exemplary embodiments described herein are not meant to be limiting. It will be readily understood that certain aspects of the disclosed systems and methods can be arranged and combined in a wide variety of different configurations.

I. OVERVIEW

Example embodiments may help to more efficiently filter, upsample, colorize, semantically segment, or perform other image processing tasks in an edge-preserving manner. In particular, color, content, depth, disparity, and/or other image information may be determined, based on an input data set, such that the output image information is relatively smooth within discrete objects or other contents of a reference image (e.g., objects, obstacles, surfaces) but may change sharply between objects.

The ability to quickly perform an image processing task in an edge-preserving manner may be beneficial in various applications. For example, a lower-resolution image that corresponds to an image of a scene (e.g., another image of the scene that is generated by an infrared camera or depth sensor) could be upsampled in an edge-aware way such that the output upsampled image may have edges corresponding to edges in the image of the scene. In another example, information about particular regions of a scene and/or of pixels of an image thereof (e.g., manually-specified colors of objects in a black-and-white image of the scene, machine-generated information about the identity of objects in the scene) could be used to generate an output image that corresponds to the input information and that may have edges corresponding to edges in the reference image of the scene. In yet another example, an image of a scene could be filtered, de-noised, or otherwise processed in an edge-preserving manner. Of course, it should be understood that the benefits and uses of example embodiments described herein are provided for explanatory purposes, and should not be construed as limiting the scope of the invention.

In some embodiments, a reference image of a scene is provided. The reference image may be generated by a camera. A target array is also provided that includes a plurality of target values. Each target value corresponds to a respective pixel of the reference image and represents some information about the pixel and/or about an object represented by the pixel. For example, the target value could represent an identity or a color of an object, a depth or distance of the object relative to the camera that generated the reference image. There may be as many target values as pixels of the reference image. For example, the target array could be another image having the same resolution as the reference image, or the target values could be color variables or other information about the pixels themselves in examples where the methods herein are used to filter the reference image in an edge-respecting manner. Alternatively, there may be fewer target values than there are pixels in the reference image. For example, the target array could be a lower-resolution image, a number of manually-specified object colors used to colorize a black-and-white image, or some other information about a limited number of pixels and/or regions of the reference image.

The reference image is then used to generate an output image based on the target values. The output image could be a colorized version of the reference image, an image identifying objects in the scene, an upsampled version of the target array (e.g., an infrared image, a depth map), a filtered version of the reference image, or some other image information. Generating the output image could include applying (e.g., minimizing) a cost function that takes as an input the target array. Such a cost function could include terms relating to the smoothness of the generated output image (i.e., to an overall degree of similarity between pixels of the output image that are proximate to each other or in some way related (e.g., that are similar in color and/or brightness, or some other metric or combination of metrics). Such a cost function could additionally include terms relating to the degree of correspondence (e.g., a similarity of color and/or brightness) between pixels of the output image and corresponding target values of the target array.

Pixels of the output image may be determined in a variety of ways. In some examples, the process of determining pixels of the output image could be simplified by associating pixels of the reference image into groups (e.g., by determining the extent of objects in the reference image using edge detection or other image processing techniques), with determined or specified features (e.g., specified blocks of the image, vertices in a space into which the pixels could be embedded), or according to some other method.

For example, each pixel of the reference image could be associated with one or more vertices in a vertex space. The vertex space could have two spatial dimensions (e.g., spatial dimensions corresponding to the two spatial dimensions of pixel locations within the frame of the reference image) and at least one color-space dimension (corresponding to the color, brightness, color-specific brightness, or properties of the reference image represented by the pixels of the first image). For example, the reference image could be a black-and-white image, and the vertex space could have two spatial dimensions corresponding to the location of pixels within the frame of the reference image and a third color-space dimension corresponding to the brightness of the pixels in the reference image. Thus, each pixel of the reference image could have a location in the vertex space could be associated with one or more vertices based on proximity to the vertices in the vertex space.

The cost function used to generate the output image could then be mapped into the vertices according to the association between the vertices and the pixels of the reference image. That mapped cost function could then be used to determine fit values for each of the vertices. There can be substantially fewer vertices than pixels in the reference image, such that solving the mapped cost function is much faster and/or less computationally intensive. The determined vertex fit values can then be used to generate the pixels of the output image according to the association between the vertices and the pixels of the reference image.

The number of dimensions in the vertex space could vary, depending upon the particular application. In some examples, output images could be determined for color reference images (e.g., for images whose pixels define colors in a color-space, e.g., a red-green-blue (RGB) color space). A vertex space corresponding to such an example could have two spatial dimensions corresponding to the location of pixels within the frame of the reference image. The vertex space could have a further three color-space dimensions corresponding to the location, in the color-space, of colors defined by the pixels of the image(s).

The locations of the vertices in the vertex space could be regularly spaced (e.g., to provide a uniform 'sampling' of the volume of the vertex space corresponding to the reference image). For example, the vertices could be located in the vertex space at the vertices of a tessellated and/or regularly repeating array of three- or more-dimensional shapes or according to some other regular pattern. In some examples, the vertices could be located in a rectangular array (i.e., regularly spaced along orthogonal directions in the multi-dimensional space, at the vertices of a tessellated array of hyper-rectangles). In some examples, the vertices could be located in a triangular array (i.e., at the vertices of triangles, tetrahedra, or higher-dimensional simplexes that are regularly tessellated in the vertex space).

It should be understood that the above embodiments, and other embodiments described herein, are provided for explanatory purposes, and are not intended to be limiting.

II. EXAMPLE IMAGES AND APPLICATIONS

Generally, imaging may refer to capturing and storing the color and brightness characteristics of a real-world environment or scene in a digital, chemical, or other format (e.g., in photographs and/or motion video). A large variety of image capture devices exist (e.g. CCDs, photodetector arrays, active pixel sensors) to facilitate capturing images in a host of different formats (e.g., color imaging, black and white imaging).

An image can be processed in a variety of ways; alternatively, the image could be used to inform processing of some other image or image-related information. In some examples, a reference image could represent a scene and the location and extent of objects in the reference image (e.g., people, animals, buildings, plants) could be used to perform some image processing task in a manner that preserves the edges of the objects in the image or that is otherwise respectful of such edges in the image. For example, the reference image itself could be filtered, de-noised, colorized, or otherwise processed in a manner that preserves the edges in the image, e.g., by smoothing the image generally but allowing sharp transitions across the edges. In some examples, information related to the scene of the image could be upsampled or otherwise processed to generate an output image of the same resolution as the reference image that may include edges or other sharp transitions corresponding to edges in the reference image. For example, a visible-light camera and a lower-resolution infrared camera could be used to generate visible and infrared images, respectively, of the same scene. The visible-light image could then be used as a reference image to generate an upsampled version of an infrared image such that the upsampled infrared image is generally smooth but may include sharp transitions or other features at the locations of edges in the reference image. Manually-specified colors, semantic information identifying contents of an image, disparity information determined from a stereo image pair, eye gaze tracking information, or other information could be used, in combination with a reference image, to generate an output image that has the same resolution as the reference image and that may include sharp transitions or other features corresponding to edges in the reference image.

FIG. 1A illustrates a scene 100 containing near object 103 and distant object 105. FIG. 1A additionally illustrates a device 110 disposed proximate to the near object 103 and configured to generate visible-light images of the scene 100 (e.g., to generate a stereo image pair of the scene 100) among other functions. By way of example and without limitation, device 110 may be a cellular mobile telephone (e.g., a smartphone), a still camera, a video camera, a computer (such as a desktop, notebook, tablet, or handheld computer), a personal digital assistant (PDA), a home automation component, a digital video recorder (DVR), a digital television, a remote control, a wearable computing device, or some other type of device equipped with at least one camera. It should be understood that device 110 may represent a discrete physical device such as a digital camera, a particular physical hardware platform on which a camera application operates in software, or other combinations of hardware and software that are configured to carry out camera functions.

Device 110 includes a camera 115a that may be operated to generate visible-light images. The device 110 additionally includes a further sensor 115b, which could be operated independently and/or collaboratively with the camera 115a (i.e., by one or more controllers of the device 110 (not shown)). The further sensor 115b could be another visible light camera (e.g., to facilitate generate of stereo image pairs), an infrared camera, a distance sensor (e.g., a laser or radar distance sensor), or some other sensing device that is operable to generate information about a scene (e.g., 100) that is imaged by the camera 115a.

Figure 1B:
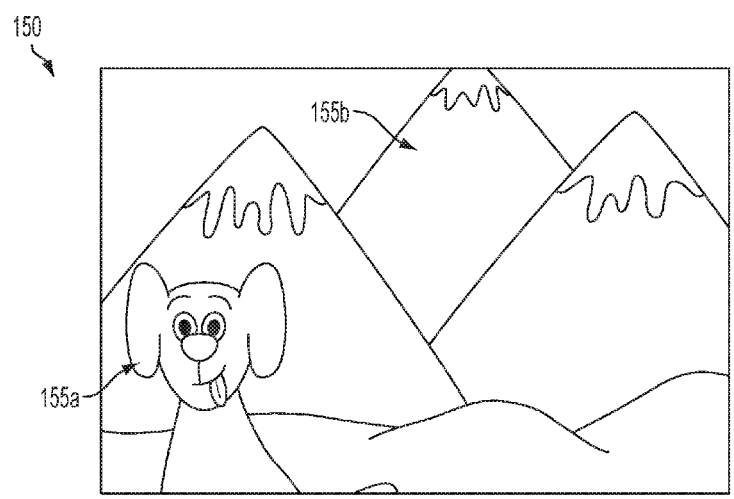
FIG. 1B is an example image of the scene depicted in FIG. 1A as captured by a camera of the device of FIG. 1A.

FIG. 1B illustrates an example reference image 150 of the scene 100, including a reference near object image 155a and a reference distant object image 155b. The example reference image 150 could be generated by the camera 115a.

The reference image 150 could be used as a source for information to perform some edge-preserving image processing, relative to the edges of objects in the reference image 150. For example, the reference image 150 could be used to generate an output image based on some target image-related information such that the output image is generally smooth but may have sharp transitions or other features corresponding to the edges in the reference image 150. This target information could take the form of an array of target values (e.g., target colors, target brightnesses, target object identifiers, target distances or disparities) that each correspond to a respective pixel of the reference image 150 and/or to a location within the target image 150. This target array could be an image having the same resolution as the reference image. For example, the target array could be the reference image itself and the output image could be a filtered version of the reference image 150. Alternatively, the target array could be a lower-resolution image than the reference image 150. In yet another example, the target array could include a number of values representing a manually-specified color, an identity of image contents, or some other information related to pixels, locations, regions, or objects within reference image 150.

In some examples, the target information could be a lower-resolution infrared image or depth map generated by the further sensor 115b and the output image could be an upsampled version of such images. Alternatively, the target information could be a number of disparity values determined based on a stereo image pair that includes the reference image 150, a lower-resolution determination of the identity of contents of the reference image 150, a manually- or automatically-specified color of one or more objects or regions of the reference image 150, or some other information determined from or otherwise related to the reference image 150.

The target array could be an image of the scene 100 having a lower resolution than the reference image 150. For example, the target array could be an image generated by an infrared camera, a depth map of distances measured using a distance sensor, or some other sensing element of the further sensor 115b. Additionally or alternatively, the target array could be an image generated from the reference image 150 and/or from some other image(s). For example, the values of the target array could be disparity values determined based on a stereo image pair that includes the reference image 150 (e.g., a stereo image pair that includes the reference image 150 and a second image generated by a visible light camera of the further sensor 115b), measures of entropy, visual interest, or some other derived local property of areas of the image, or some other lower-resolution image determined based on the reference image 150. The lower resolution image could be upsampled, in an edge-preserving manner, based on the reference image 150.

Figure 2A:
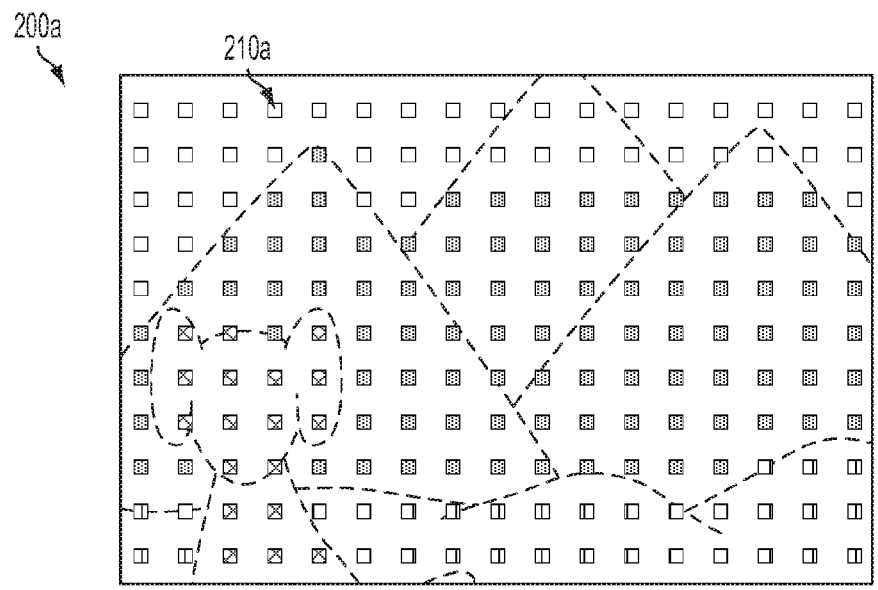
FIG. 2A is a first example target array representing a lower-resolution image of the scene depicted in FIG. 1A.

FIG. 2A illustrates a first example target array 200a that represents a lower-resolution image of the scene 100, including a number of target values 210a. Each target value could represent a color, a brightness, a temperature, a disparity, a depth, a distance, an image entropy, image flow information, or some other information related to the scene 100, the reference image 150, and/or pixels, objects, or regions thereof. The outlines of objects in the reference image 150 are shown in FIG. 2A by dashed lines.

The first example target array 200a could be generated by an infrared camera, an ultraviolet camera, a distance sensor, or some other sensing device. For example, the target values 210a of the first target array 200a could represent temperatures of objects or areas of the scene 100 as detected using an infrared camera. In another example, the target values 210a of the first target array 200a could represent distances between a camera used to generate the reference image 150 (e.g., camera 115a) and objects or areas of the scene 100 that are represented by pixels of the reference image 150 corresponding to the target values 210a.

The target array could represent some information about a number of specified areas of the scene 100 and/or pixels or regions of the reference image 150. For example, the target array could include target values that describe objects within the scene 100 that are represented by pixels of the reference image 150 corresponding to the target values. Such target values could be categorical (e.g., 1=person, 2=bike, 3=furniture), related to a single type of object (e.g., 1=person, 0=not a person), related to a confidence in the identity of the object (e.g., 1=certainly a person, 0.1=not likely a person), or could otherwise describe objects that are represented in the reference image 150. Such target values could be determined by an algorithm (e.g., by pattern matching, a neural net, or some other method) and/or could be determined based on manual input from a person.

Figure 2B:
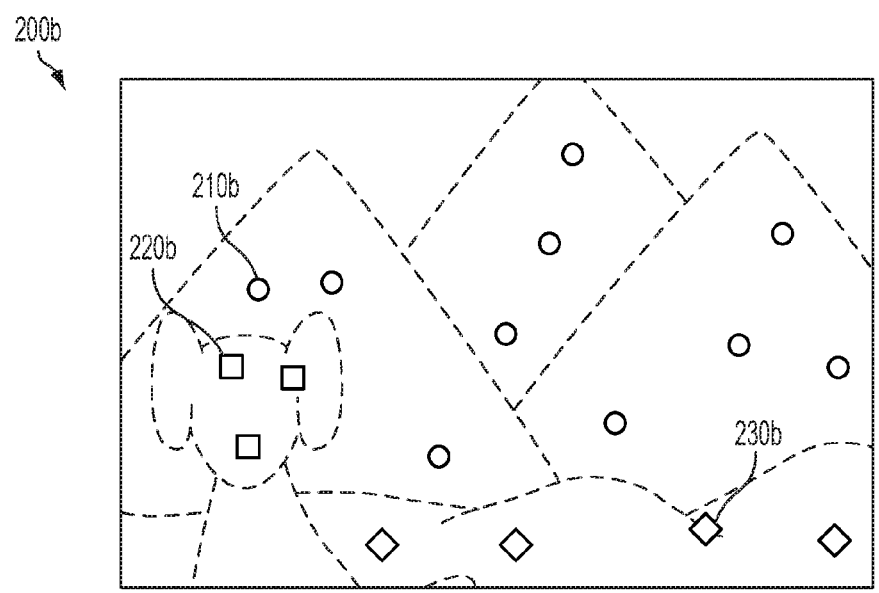
FIG. 2B is a second example target array representing semantic classifications of regions of the image of FIG. 1B.

FIG. 2B illustrates a second example target array 200b that includes a number of target values 210b, 220b, 230b that correspond to respective pixels of and/or locations within the reference image 150. The target values of the second example target array 200b represent the identity of objects represented by corresponding pixels of the reference image 150. For example, a first set of target values 210b of the second target array 200b describe a mountain, a second set of target values 220b of the second target array 200b describe a dog, and a third set of target values 230b of the second target array 200b describe grass. The outlines of objects in the reference image 150 are shown in FIG. 2B by dashed lines. As shown, the second example target array 200b includes target values corresponding to a few locations and/or pixels of the reference image 150; however, such an object-describing target array could include target values corresponding to each of the pixels of a reference image. Depending on the method used to generate such a higher-resolution object-identifying target array, such a target array could exhibit low-confidence, discontinuous, or otherwise low-quality identification of objects in a scene near the edges of objects in the scene.

The target array could represent color information about a number of specified areas of the scene 100 and/or pixels or regions of the reference image 150. For example, the target array could include target values that describe the color of objects within the scene 100 that are represented by pixels of the reference image 150 corresponding to the target values 210a. Such target values could be determined by an algorithm (e.g., by pattern matching, a neural net, or some other method) and/or could be determined based on manual input from a person. For example, a person could manually apply a desired color to the center of each of a number of different objects within the image.

Figure 2C:
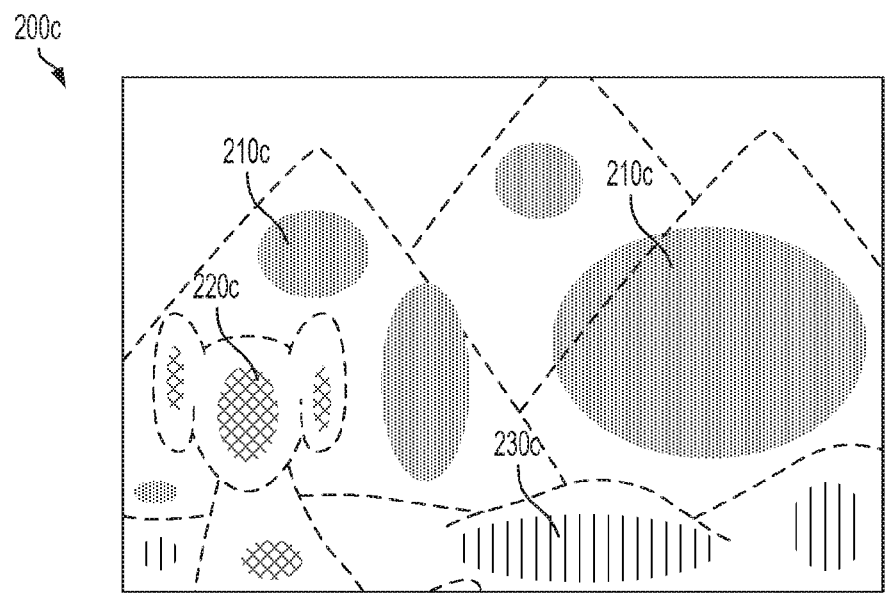
FIG. 2C is a third example target array representing a prospective coloration of regions of the image of FIG. 1B.

FIG. 2C illustrates a third example target array 200c that includes target values 210c, 220c, 230c that correspond to respective specified colors of pixels and/or locations within the reference image 150. The target values of the third example target array 200c represent the color of objects represented by corresponding pixels of the reference image 150. For example, a first set of target values 210c of the third target array 200c could represent the color gray (corresponding to a specified color of mountains), a second set of target values 220c of the third target array 200c could represent the color brown (corresponding to a specified color of a dog), and a third set of target values 230c of the third target array 200c could represent the color green (corresponding to a specified color of a grass or other plants). The outlines of objects in the reference image 150 are shown in FIG. 2C by dashed lines. As shown, the third example target array 200c includes target values corresponding to a few locations and/or sets of pixels of the reference image 150; however, such a color-representing target array could include target values corresponding to each of the pixels of a reference image.

A target array (e.g., 200a, 200b, 200c) could be used, in combination with a reference image (e.g., 150) to generate an output image based on the target area in a manner that preserves edges in the reference image. For example, the target array could be upsampled, filtered, or otherwise processed to generate an output image that corresponds to the content of the target array (e.g., an infrared image, an image describing the identity of objects in the image, a depth map, a color map of the reference image) and that is generally smooth but that may include sharp transitions, edges, or other features corresponding to edges in the reference image.

Figure 3:
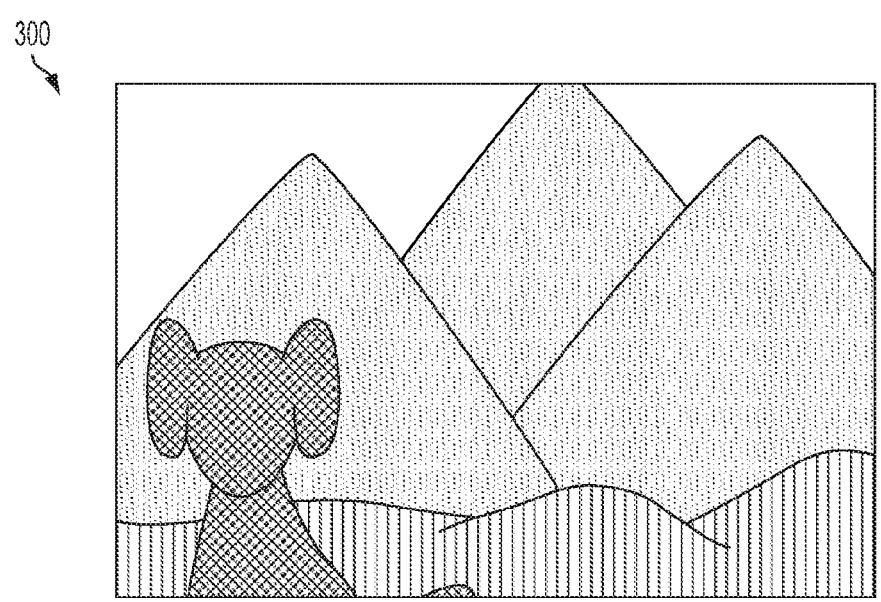
FIG. 3 depicts an example output image that could be determined based on an input target array and on the image of FIG. 1B.

FIG. 3 illustrates an example output image 300 that could correspond to one of the targets arrays 200a, 200b, 200c and that preserves edges that are present in the reference image 150. For example, the output image 300 could correspond to a lower-resolution infrared image represented by the first example target array 200a such that the grayscale color of a particular pixel of the output image 300 corresponds to a temperature of an object that is represented by a corresponding pixel of the reference image 150. In another example, the output image 300 could correspond to the identities of objects in the reference image 150 represented by the second example target array 200b such that the grayscale color of a particular pixel of the output image 300 corresponds to the identity (e.g., dog, mountain) of an object that is represented by a corresponding pixel of the reference image 150. In yet another example, the output image 300 could correspond to the specified colors of objects in the reference image 150 represented by the third example target array 200c such that the grayscale color of a particular pixel of the output image 300 corresponds to the color (e.g., gray, brown, green) of an object that is represented by a corresponding pixel of the reference image 150. The output image 300 could be generated, based on the reference image 150 and a target array (e.g., 200a, 200b, 200c) in a variety of ways.

III. EXAMPLE IMAGE PROCESSING TASKS

Generating an output image from input data (e.g., lower-resolution image data, object description data) in an edge-preserving manner relative to a reference image could be a computationally expensive process. The process of generating the output image could include determining information for each pixel of the output image (e.g., determining pixel colors, brightnesses, depths, objects description categories, or other variable(s) for each of the pixels). Such a determination could include comparing properties of a given pixel of the output image (e.g., color, location) to one or more values of the input data, e.g., to one or more target values of a target array. The pixels of the output image could be determined such that they correspond to respective target values, e.g., such that the output image is an upsampled, filtered, or otherwise modified version of the input data.

The correspondence between pixels of such a modified output image and target values of an input target array could be related to the location of the output image pixels in a pixel space (e.g., a two-dimensional pixel space within the frame of the output image and/or reference image) relative to pixel locations of target values of the target array. This could include determining a correspondence between each target value and a respective one or more individual pixels of the output image. For example, the target array could include as many target values as there are pixels in the output image (e.g., the target array could be, itself, an image) and the target values could each correspond to a respective unique pixel of the output image.

The filtered output image pixels could be determined to apply some cost or error function relative to the input target array. For example, the output image pixels could be determined to minimize a sum, a product, or some other cost function determined based on the relationship (e.g., the difference) between the pixels of the output image and the target values of the target array. Such a cost function could be a quadratic cost function, a linear cost function, or some other function of the difference between the output image pixels and the values of the target array. Gradient descent, a genetic algorithm, simulated annealing, or some other method or combination of methods could be used to determine the output image pixels to minimize, reduce, maximize, increase, or otherwise apply the cost function.

In order to generate an output image that is smooth, but that preserves edges present in the reference image, pixels of the output image could be determined in consideration of each other. For example, a cost function could be determined that includes a data term related to the correspondence between the output image and the target array and that further includes a smoothness term related to the similarity between individual pixels of the output image (e.g., related to the similarity between neighboring or otherwise nearby pixels of the output image) could be applied (e.g., using gradient descent, dynamic programming, or some other method) to determine disparity values for pixel locations of the first image. Such a smoothness term could be determined, based on the reference image, such that the output image pixels corresponding to pixels on either side of an edge in the reference image are able to differ from each other more than output image pixels corresponding to reference image pixels that are not separated by such an edge.

An example cost function that includes a smoothness term (to the left of the addition symbol) and a loss term (to the right of the addition symbol) is described by the following equation:

$$\frac{\lambda}{2}\sum_i \sum_j \hat{W}_{i,j}(x_i - x_j)^2 + \sum_i c_i(x_i - t_i)^2$$

wherein $x_i$ is the value (e.g., brightness, red intensity, blue intensity, temperature, depth, disparity, object identity) of the $i^{th}$ pixel of a filtered output image. The $i^{th}$ pixel of the output image corresponds to $t_i$, the $i^{th}$ target value of a target array. $\hat{W}$ is a pixel affinity matrix that includes a plurality of values. $\hat{W}_{i,j}$ is a value of the pixel affinity matrix that corresponds to a degree of similarity between determined the $i^{th}$ and $j^{th}$ pixels of the filtered output image. Thus, a higher value for $\hat{W}_{i,j}$ will result in a higher cost for a given difference between a determined value $x_i$ of the $i^{th}$ filtered output image pixel and a determined value $x_j$ of the $j^{th}$ filtered output image pixel. $\lambda$ is a weighting factor that can be specified to set a relative importance of the smoothness term and the loss term in determining the overall cost of a given set of determined filtered output image pixels x (where the $i^{th}$ element of x is $x_i$, the determined value for the $i^{th}$ filtered output image pixel).

As shown, the cost function is quadratic with respect to the difference between each output pixel and the respective target value of the input target array, t (where the $i^{th}$ element of t is $t_i$). That squared difference is then scaled according to a corresponding confidence value, $c_i$, of a confidence array c. The confidence array is provided such that the correspondence between particular pairs of output pixel values and target array values is greater than for other pairs. Such confidence values could correspond to a degree of confidence, noise level, variance, or other measure of the quality of individual target values of the target array. Note that the confidence array is provided here as an example and could be omitted (e.g., the confidence values could all set to one).

Note that, while the illustrated target array includes a target value for each pixel of the output image (that is, there are as many target values as output image pixels), a target array as described herein could include fewer target values. In such an example, the illustrated cost function could be altered to only sum differences for those output image pixels that have corresponding target values. Additionally or alternatively, an input target array could be expanded to include as many target values as there are pixels in the output image (e.g., by adding values to the target array that are set to zero or to some other arbitrary value, or by upsampling the target array). This could include setting the confidence values corresponding to the added target values to zero, e.g., to prevent the added target values from affecting the generated output image.

The illustrated loss term, where each target value corresponds to a respective pixel of the output image and/or of the reference image, is intended as a non-limiting example. Alternative loss terms could be used. For example, a loss term could be based on differences between a single target value and multiple output image pixels, a weighted difference between an output image pixel and a number of target values (e.g., weighted according to distance between the location in pixel space of the output image pixels and the target values), or according to some other consideration.

The elements of the pixel affinity matrix, $\hat{W}_{i,j}$, could be chosen such that the smoothness cost for similarity between the $i^{th}$ and $j^{th}$ output image pixels is related to proximity between the $i^{th}$ and $j^{th}$ output image pixels within the frame of the output image and/or between the $i^{th}$ and $j^{th}$ reference image pixels within the frame of the reference image. For example, the smoothness cost for similarity could be related to an exponential or other function of the distance, within the frame of the reference image, between the pixel locations of the $i^{th}$ and $j^{th}$ reference image pixels, which correspond respectively to the $i^{th}$ and $j^{th}$ output image pixels. Additionally or alternatively, the smoothness cost for similarity could be zero for pairs of $i^{th}$ and $j^{th}$ pixel locations that are more than a specified distance away from each other or according to some other criterion. The elements of the pixel affinity matrix, could be chosen such that the smoothness cost for similarity between determined values for the $i^{th}$ and $j^{th}$ filtered output image pixels is related to some other property or properties of the output image pixels and/or of the corresponding reference image pixels (e.g., a similarity between a brightness, a color, or some other property or properties of the reference image pixels).

In some examples, the pixel affinity matrix could be sparse, that is, many of the elements of the pixel affinity matrix could be zero. For example, fewer than half of the elements of the pixel affinity matrix could be zero, or fewer than a percent of the elements of the pixel affinity matrix could be zero. For example, the smoothness cost for similarity could be zero for pairs of $i^{th}$ and $j^{th}$ pixel locations that are not adjacent. In such a scenario, $\hat{W}$ could be a sparse matrix, as the $\hat{W}_{i,j}$ corresponding to pairs of $i^{th}$ and $j^{th}$ pixels that are not adjacent would be zero.

The elements of the pixel affinity matrix, $\hat{W}_{i,j}$, could be chosen such that the smoothness cost for similarity between determined values for the $i^{th}$ and $j^{th}$ filtered output image pixels is related to a similarity in space (e.g., to proximity between pixel locations in the frame of the reference image) and similarity in color-space (e.g., to a proximity in luminance-chrominance (LUV) or some other color-space representation of the color of the reference image pixels) of the reference image pixels corresponding to the filtered output image pixels. For example, the elements $\hat{W}_{i,j}$ could be Gaussian potentials between all pairs of reference image pixels defined in a five-dimensional XYLUV (e.g., location (XY) within the frame of the reference image and color-space representation (LUV)) space (related, e.g., to bilateral filters):

$$W_{i,j} = \exp\left(-\frac{([p_i^x, p_i^y] - [p_j^x, p_j^y])^2}{2\sigma_{xy}^2} - \frac{(p_i^l - p_j^l)^2}{2\sigma_l^2} - \frac{([p_i^u, p_i^v] - [p_j^u, p_j^v])^2}{2\sigma_{uv}^2}\right)$$

wherein $p_i^x$, $p_j^x$ represent the horizontal location of the $i^{th}$ and $j^{th}$ reference image pixels, respectively, within the frame of the reference image and $p_i^y$, $p_j^y$ represent the vertical location of the $i^{th}$ and $j^{th}$ reference image pixels, respectively, within the frame of the reference image. Further $p_i^l$, $p_i^u$, $p_i^v$ represent the luminance and chrominance values of the $i^{th}$ reference image pixel and $p_j^l$, $p_j^u$, $p_j^v$ represent the luminance and chrominance values of the $j^{th}$ reference image pixel. $\sigma_{xy}^2$ is a scaling factor for location within the frame of the reference image, $\sigma_l^2$ is a scaling factor for luminance, and $\sigma_{uv}^2$ is a scaling factor for chrominance.

This type of pixel affinity matrix definition (taking into account spatial similarity within the frame of the reference image and color-space similarity) can facilitate image processing that is edge-preserving, relative to contents a reference image, when calculated based on the pixel locations and color variables of the pixels of the reference image.

Note that other pixel affinity matrix elements, $\hat{W}_{i,j}$, could be determined, specified, or otherwise used to determine a cost function or to otherwise determine a set of determined values for pixels of a filtered output image based on some input target array. For example, the elements $\hat{W}_{i,j}$ could be determined based on Gaussian potentials defined in the XY space within the frame of the reference image (e.g., using an equation similar to the equation above, but omitting the right term within the exponential). Other example functions, classes of functions, functionals, or other methods to determine and/or specify the elements of a pixel affinity matrix, $\hat{W}_j$, are anticipated.

The elements of the pixel affinity matrix, $\hat{W}_j$, could be chosen such that a matrix of the affinity factors $\hat{W}$ (i.e., a matrix whose $[i,j]^{th}$ element is $\hat{W}_{i,j}$) is symmetric and bistochastic (i.e., such that $\hat{W}_{i,j} = \hat{W}_{j,i}$ and such that the such of each row of $\hat{W}$ sums to one and such that each column of $\hat{W}$ sums to one). The use of symmetric and bistochastic pixel affinity matrices, $\hat{W}$, could allow for more efficient computation of the smoothness term (e.g., by allowing for some simplification of one or more matrix multiplication or other procedures involved in, e.g., performing gradient descent using the cost function to determine a set of values for pixels of a filtered output image).

Such a bistochastic pixel affinity matrix could be determined from a non-bistochastic pixel affinity matrix (e.g., from the W defined in terms of the $\hat{W}_{i,j}$ illustrated above) in a variety of ways, e.g., by pre- and post-multiplication by one or more diagonal matrices. Such diagonal matrices could be determined directly, e.g., by determining as many on-diagonal elements of the matrices as there are pixels of the filtered output image and/or reference image. Alternatively, such diagonal matrices could be determined in a vertex space as described below after mapping the pixel affinity matrix into such a vertex space.

IV. EMBEDDING STEREO IMAGE DATA IN A VERTEX SPACE AND EXAMPLE VERTEX SPACES

Determination of a value, based on an input target array, for each pixel of a high-resolution filtered output image could be computationally expensive (due, e.g., to the total number of pixels in an image scaling roughly with the square of the image resolution). The computational effort (e.g., processor resources (e.g., MIPS), processor time) required to determine pixel values (e.g., a depth map, an object identification for each pixel of a reference image, a color overlay for a black-and-white reference image) for a given number of filtered output image pixels (or other points or other features of an image) can be related to the number of pixels in an exponential fashion. Thus, determining such sets of pixel colors, temperatures, object categories, depths, distances, colors, or other values based on larger and/or more detailed reference images and/or target arrays can be intractable given finite computational resources and/or finite available time for computation (e.g., the limited computational resources of a mobile device).

In response, a number of methods could be employed to simplify the task of determining pixels of a filtered output image. In some examples, pixel values could be determined in a first step for a subset of pixels of the output image (e.g., for a regularly spaced subset of pixel locations within an image) and the determined values could be interpolated for pixels of the filtered output image that are not in the subset of pixels for which values were determined in the first step. In some examples, a reference image could be blocked or otherwise partitioned (e.g., in regular blocks, or according to areas corresponding to determined objects within the reference image, e.g., by some image processing) and individual target values could be applied (e.g., by weighted combination) to individual blocks or other partitions according to their location within the frame of the reference image. The values determined for a particular partition could then be applied to all of the output image pixels within the partition.

The problem of determining pixels of a filtered output image could be simplified by mapping the problems onto a smaller number of representative variables. For example, pixels of a reference image could be associated with vertices in a vertex space, where the number of vertices is significantly fewer than the number of pixels (e.g., less than half, less than one percent, less than a tenth of a percent). The association could be based on a proximity or other relationship within the vertex space between the pixel locations and colors of the reference image pixels and the vertices (e.g., a given reference image pixel could be associated with the nearest vertex within the vertex space, or with a set of vertices (e.g., a set of vertices defining the vertices of a shape in the vertex space that encloses the given pixel)). The vertex space could have spatial dimensions (e.g., dimensions corresponding to horizontal and vertical dimensions of the pixel locations of the reference image pixels within the reference image) and one or more color-space dimensions (e.g., dimensions corresponding to the brightness, color, red, green, or blue intensity, luminance, chrominance, or other properties of the reference image pixels within a color-space).

The association between the pixels of the reference image and the vertices in the vertex space could be defined by an association matrix. Such an association matrix could have non-zero elements corresponding to pairs of pixels and vertices that are associated and zero-valued elements corresponding to pairs of pixels and vertices that are not associated. The association could be of equal weight between a vertex and a number of reference image pixels associated therewith and/or between a pixel and a number of vertices associated therewith (e.g., a particular pixel could be equally associated with the three vertices most proximate to it in the vertex space). Alternatively, the association could be weighted according, e.g., to the relative proximity in the vertex space between a vertex and each reference image pixel associated therewith and/or between a pixel and each vertex associated therewith.

As each reference pixel is likely to be associated with few vertices (e.g., each pixel may only be associated with the single vertex that is most proximate to it in the vertex space), many elements of the association may be zero. For example, fewer than half of the elements of the association matrix may be zero. In some examples, fewer than a percent of the elements of the association matrix may be zero. In further examples, fewer than a tenth of a percent of the elements of the association matrix may be zero. The proportion of elements of the association matrix that are nonzero may be related to the relative number of pixels and vertices, the number of vertices that may be associated with a single vertex (or vice versa), and/or the method of associating the pixels with the vertices.

Based on an association between pixels of the reference image and vertices in the vertex space, a process related to the reference image (e.g., the edge-preserving generation of a filtered output image based on an input array of target values) could be simplified (e.g., performed in less time and/or by using less computational resources) by translating the process such that the process can be performed for the vertices (which could number substantially fewer than the number of pixels of the reference image and/or the number of pixels of the filtered output image). The results of the process performed on the vertices (e.g., the determined vertex fit values for each of the vertices) could then be used to generate the filtered output image (e.g., by interpolating or otherwise calculating values for a particular pixel of the filtered output image based on determined vertex fit values of vertices associated with the particular filtered output image pixel and/or the reference image pixel corresponding thereto).

Figure 4A:
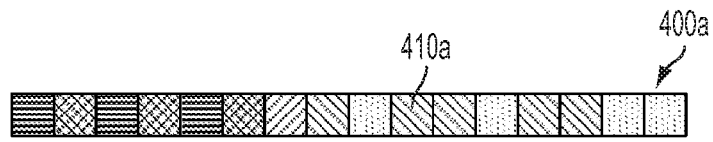
FIG. 4A depicts pixel locations of an example one-dimensional image.

To illustrate the association of pixels of a reference image with vertices in a vertex space, FIG. 4A depicts an example one-dimensional image 400a (i.e., a one-dimensional strip of pixels). Pixels of the image 400a (including given pixel 410a) define respective brightnesses (i.e., individual pixels of the image 400a define colors within a one-dimensional (e.g., black-and-white) color-space).

Figure 4B:
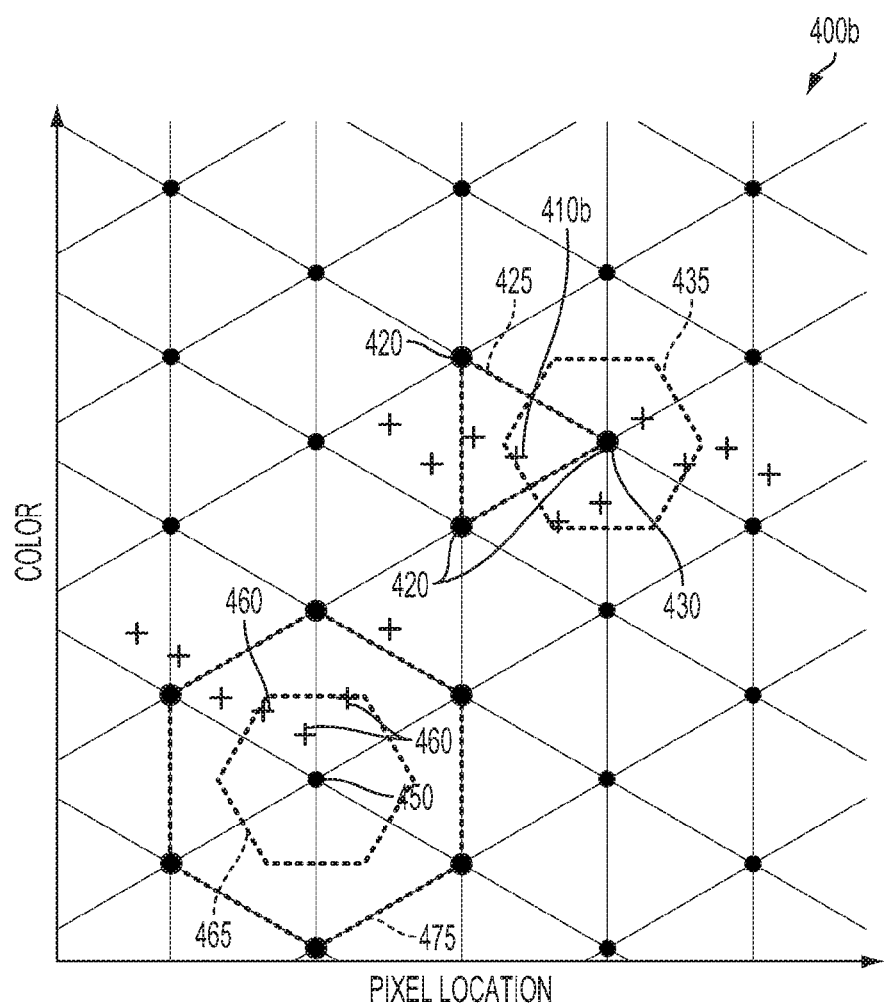
FIG. 4B depicts an example vertex space containing example vertices into which the pixel locations of FIG. 4A have been embedded.

FIG. 4B depicts an example two-dimensional vertex space 400b. The vertex space 400b includes a spatial dimension (labeled 'Pixel Location,' illustrated as the horizontal axis) corresponding to the location of the pixels of the image 400a within the one-dimensional 'frame' of the image 400a. The vertex space 400b additionally includes a color-space dimension (labeled 'Color,' illustrated as the vertical axis; brighter pixels are located in higher locations within the vertex space 400b). The locations of the pixels of the image 400a within the vertex space 400b are indicated by crosses. A plurality of vertices are located in the vertex space 400b. The locations of the vertices are regularly spaced in the vertex space 400b in a triangular pattern and indicated by dots. The vertices within the vertex space 400b could be described as being at the location of vertices of a regularly-stacked (or tessellated) pattern of regular 2-simplexes (i.e., triangles).

The pixels of the image 400a could be associated with vertices within the vertex space 400b according to proximity or some other property of the relative location of the pixels and vertices within the vertex space 400b. Such an association could be defined by an association matrix. In a first scheme of association of pixels with vertices, a given pixel 410b in the vertex space 400b (corresponding to the given pixel 410a of the image 400a) could be associated with three vertices 420 that define an enclosing triangle 425 that encloses an area (or more generally, a space of dimension equal to the number of dimensions of the vertex space) of the vertex space that contains the given pixel 410b. In such an example association, the given pixel 410b could be equally associated with each of the three vertices 420 or could be associated in a weighted fashion according to some function or other consideration. For example, the given pixel 410b could be associated with individual vertices of the three vertices 420 according to respective distances in the vertex space 400b between the given pixel 410b and the individual vertices (e.g., according to some barycentric partition or other assignment of the given pixel 410b between the vertices of the three vertices 420).

Similarly, other pixels within the enclosing triangle 425 could be associated with the three vertices 420 (though the weighting of the association between a first pixel within 425 and the three vertices 420 could be different from the weighting of the association between a second pixel within 425 and the three vertices 420 according, e.g., to a difference in the location within the vertex space 400b of the first and second pixels). To further illustrate this example association scheme, an example vertex 450 could be associated with pixels within a first example space 475. The first example space 475 could be defined as the set of enclosing triangles that include the first example vertex 450 as a vertex.

As an example of another scheme of association, the given pixel 410b could be associated with a closest vertex 430 of the plurality of vertices that is closest to the given pixel. Under such a scheme of association, pixels in the vertex space that are within an enclosing space 435 could also be associated with the first vertex. The enclosing space 435 could be defined as the subset of space within the vertex space 400b within which the closest vertex 430 is the closest vertex of the plurality of vertices. To further illustrate this example association scheme, the example vertex 450 could be associated with pixels 460 within a second example space 465. The second example space 465 could be defined as the subset of space within the vertex space 400b within which the example vertex 450 is the closest vertex of the plurality of vertices.

Note that the location of the plurality of vertices in the vertex space 400b, as illustrated in FIG. 4B, is meant as a non-limiting example of a pattern of location of vertices in a vertex space. As illustrated, the vertices are located in the vertex space 400b at the vertices of equilateral, regularly-tiled triangles (i.e., regular 2-dimensional simplexes). The vertices could instead be located in some other regular or irregular pattern in the vertex space 400b according to an application.

For example, the vertices could be located in the vertex space 400b at the vertices of regularly-tiled irregular triangles (e.g., isosceles triangles, scalene triangles). The angle of the major axis of the tiling of the triangles could be parallel to one of the axes of one or more of the dimensions of the vertex space 400b (e.g., parallel to the 'Pixel Location' Axis, as illustrated in FIG. 4B) or could have some other orientation. The vertices could have a first 'effective resolution' (i.e., a period of pattern repetition) in a first direction or directions in the vertex space 400b (e.g., a first period of repetition in spatial dimension of a vertex space) and a second 'effective resolution' in a second direction or directions (e.g., a second period of repetition in a color-space dimension of the vertex space). Other patterns, scales, and schemes of association with pixels of a plurality of vertices in a vertex space are anticipated.

Figure 5A:
FIG. 5A depicts pixel locations of an example one-dimensional image.

To illustrate another example of the association of pixels of an image with vertices in a vertex space, FIG. 5A depicts an example one-dimensional image 500a (i.e., a one-dimensional strip of pixels). Pixels of the image 500a (including given pixel 510a) define respective brightnesses (i.e., individual pixels of the image 500a define colors within a one-dimensional (e.g., black-and-white) color-space).

Figure 5B:
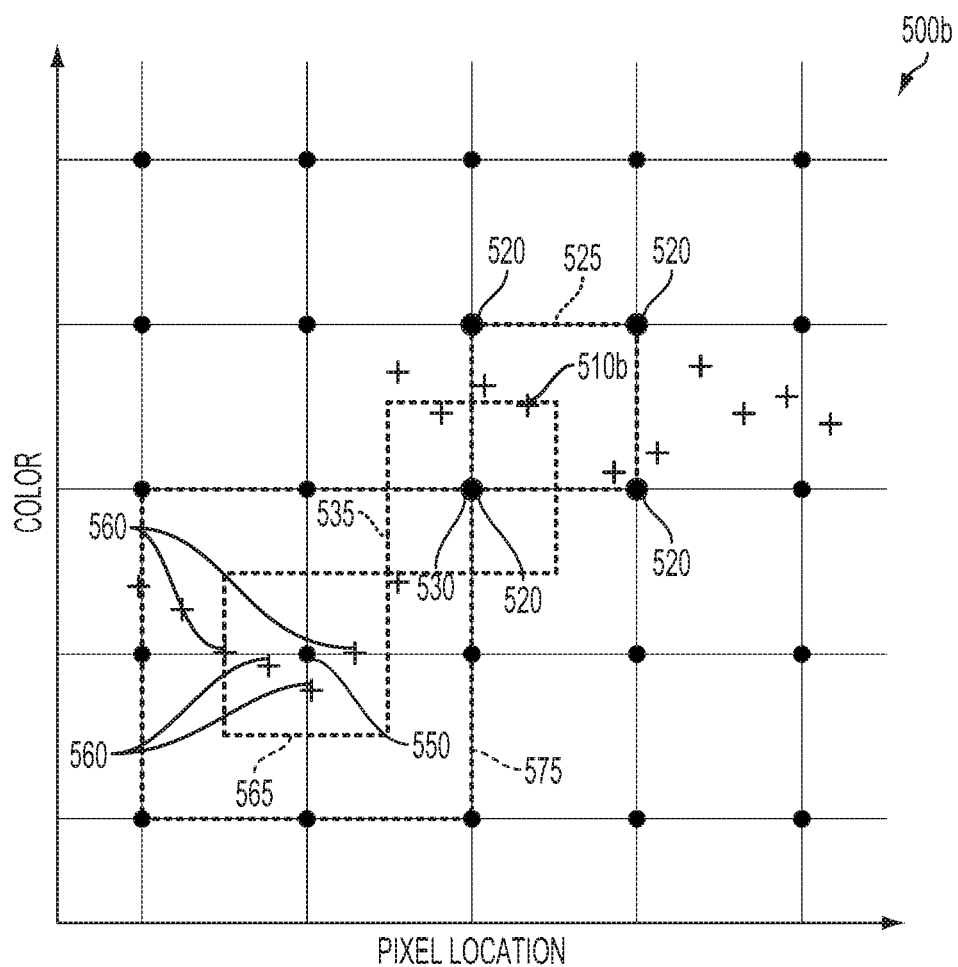
FIG. 5B depicts an example vertex space containing example vertices into which the pixel locations of FIG. 5A have been embedded.

FIG. 5B depicts an example two-dimensional vertex space 500b. The vertex space 500b includes a spatial dimension (labeled 'Pixel Location,' illustrated as the horizontal axis) corresponding to the location of the pixels of the image 500a within the one-dimensional 'frame' of the image 500a. The vertex space 500b additionally includes a color-space dimension (labeled 'Color,' illustrated as the vertical axis; brighter pixels are located in higher locations within the vertex space 500b). The locations of the pixels of the image 500a within the vertex space 500b are indicated by crosses. A plurality of vertices are located in the vertex space 500b. The locations of the vertices are regularly spaced in the vertex space 500b in a square pattern and indicated by dots. The vertices within the vertex space 500b could be described as being at the location of vertices of a regularly-stacked (or tessellated) pattern of regular squares (i.e., 2-dimensional hypercubes).

The pixels of the image 500a could be associated with vertices within the vertex space 500b according to proximity or some other property of the relative location of the pixels and vertices within the vertex space 500b. In a first scheme of association of pixels with vertices, a given pixel 510b in the vertex space 500b (corresponding to the given pixel 510a of the image 500a) could be associated with four vertices 520 that define an enclosing square 525 that encloses an area (or more generally, a space of dimension equal to the number of dimensions of the vertex space) of the vertex space that contains the given pixel 510b. In such an example association, the given pixel 510b could be equally associated with each of the four vertices 520 or could be associated in a weighted fashion according to some function or other consideration. For example, the given pixel 510b could be associated with individual vertices of the four vertices 520 according to respective distances in the vertex space 500b between the given pixel 510b and the individual vertices (e.g., according to some barycentric partition or other assignment of the given pixel 510b between the vertices of the four vertices 520).

Similarly, other pixels within the enclosing square 525 could be associated with the four vertices 520 (though the weighting of the association between a first pixel within 525 and the four vertices 520 could be different from the weighting of the association between a second pixel within 525 and the four vertices 520 according, e.g., to a difference in the location within the vertex space 500b of the first and second pixels). To further illustrate this example association scheme, an example vertex 550 could be associated with pixels within a first example space 575. The first example space 575 could be defined as the set of enclosing squares that include the first example vertex 550 as a vertex.

As an example of another scheme of association, the given pixel 510b could be associated with a closest vertex 530 of the plurality of vertices that is closest to the given pixel. Under such a scheme of association, pixels in the vertex space that are within an enclosing space 535 could also be associated with the first vertex. The enclosing space 535 could be defined as the subset of space within the vertex space 500b within which the closest vertex 530 is the closest vertex of the plurality of vertices. To further illustrate this example association scheme, the example vertex 550 could be associated with pixels 560 within a second example space 565. The second example space 565 could be defined as the subset of space within the vertex space 500b within which the example vertex 550 is the closest vertex of the plurality of vertices.

Note that the location of the plurality of vertices in the vertex space 500b, as illustrated in FIG. 5B, is meant as a non-limiting example of a pattern of location of vertices in a vertex space. As illustrated, the vertices are located in the vertex space 500b at the vertices of regular, regularly-tiled rectangles (i.e., squares or regular 2-dimensional hypercubes). The vertices could instead be located in some other regular or irregular pattern in the vertex space 500b according to an application.

For example, the vertices could be located in the vertex space 500b at the vertices of regularly-tiled irregular hyperrectangles. The angle of the major axis of the tiling of the squares, rectangles, hypercubes, hyper-rectangles, or other stacked, tiles, or otherwise tessellated shapes could be parallel to one of the axes of one or more of the dimensions of the vertex space 500b (e.g., parallel to both the 'Pixel Location' axis and the 'Color' axis, as illustrated in FIG. 5B) or could have some other orientation. The vertices could have a first 'effective resolution' (i.e., a period of pattern repetition) in a first direction or directions in the vertex space 500b (e.g., a first period of repetition in spatial dimension of a vertex space) and a second 'effective resolution' in a second direction or directions (e.g., a second period of repetition in a color-space dimension of the vertex space). Other patterns, scales, and schemes of association with pixels of a plurality of vertices in a vertex space are anticipated.

Note that the one-dimensional images 400a, 500a and corresponding two-dimensional vertex spaces 400b, 500b as illustrated in FIGS. 4A, 5A, 4B, and 5B, respectively, are intended as illustrative examples of a method for associating pixels of an image (e.g., a two-dimensional image comprising a two-dimensional array of pixels) with vertices in a vertex space (e.g., a vertex space having a number of spatial dimensions equal to a number of dimensions of a corresponding image and one or more color-space dimensions corresponding to color-space information of pixels of the image). In one example, pixels of a two-dimensional black-and-white (or greyscale) image could be associated with vertices in a three-dimensional vertex space having two spatial dimensions corresponding to the two dimensions (e.g., the horizontal and vertical directions) of the image and a third color-space dimension corresponding to the brightness or other greyscale information defined by the pixels of the image.

In another example, pixel locations of a two-dimensional color (e.g., RGB, LUV, $YP_BP_R$, $YC_BC_R$) image could be associated with vertices in a five-dimensional vertex space having two spatial dimensions corresponding to the two dimensions (e.g., the horizontal and vertical directions) of the image and three color-space dimensions corresponding to the color-space information (e.g., red-, green-, and blue-color intensities) defined by the pixels of the image. Additional or fewer spatial (e.g., corresponding to 1-dimensional line images or 3-dimensional volumetric or holographic images) and/or color-space (e.g., corresponding to hyperspectral color channels, corresponding to polarization information channels) dimensions of a vertex space are anticipated.

Further, note that the location of vertices within a vertex need not be regular, but could be specified according to any regular or irregular scheme according to an application. For example, the vertices could be located according to the centroids of a Gaussian or other KD-tree, a set of vertices resulting from greedy consolidation of an initial regularly-spaced set of vertices, or according to some other spacing within the vertex space and/or partitioning of the vertex space.

Generally, pixels of an image (e.g., a reference image, a filtered output image) and/or information thereof (e.g., brightnesses, colors, depth values, temperatures, object identification information) could be based on a weighted combination of corresponding associated vertices and/or information thereof (e.g., vertex brightnesses, etc.). Specifically, for the case wherein pixels of a filtered output image are determined based on determined vertex fit values, pixels of the filtered output image (e.g., brightnesses or other variables of such pixels) could be related to determined vertex fit values by:

$$x = S^T y$$

where x is a vector of determined filtered output image pixels, y is a vector of determined vertex fit values, and $S^T$ is an association matrix whose elements define the association between individual vertices and individual pixels of the reference image (and thus, between individual vertices and individual pixels of the filtered output image, which respectively correspond to the pixels of the reference image).

Thus, a particular row of $S^T$ corresponding to a respective particular pixel (of the reference image or filtered output image) is zero for all columns corresponding to vertices that are not associated with the particular pixel. The particular row has a nonzero value for all columns that are associated with the particular pixel. Such nonzero values could be related to the degree of association between the particular pixel and a corresponding vertex. Such nonzero values could be used to determine the brightness, color, depth, disparity, object identity, or other value of the particular pixel relative to the corresponding determined vertex fit values. Alternatively, $S^T$ could be a full matrix (i.e., could have substantially no nonzero entries) if individual pixels of a reference image are, to some nonzero degree, related to all of the vertices in a vertex space.

Relative to the example associations between pixels and vertices as described elsewhere herein (e.g., in FIGS. 4A, 4B, 5A, and 5B), nonzero elements of a particular row of $S^T$ could correspond to vertices associated with the pixels corresponding to the particular row, and the relative value of the nonzero elements could correspond to the relative weighting of the relationship of the particular pixel with the associated vertices (e.g., according to a relative distance between the particular pixel and the vertices, e.g., according to some barycentric weighting).

As noted elsewhere herein, pixels of a reference image could be associated with respective vertices in a vertex space. A target array, containing a plurality of target values, could then be used to generate a filtered output image in a manner that respects edges present in the reference image. Each pixel of the filtered output image could correspond to a respective pixel of the reference image. Further, each target value of the target array could correspond to one or more pixels of the reference image, e.g., according to pixel locations, within the frame of the reference image, of the pixels of the reference image and pixel locations, within the frame of the reference image, of the target values. For example, each target value could correspond to a respective pixel of the reference image. Thus, each target value can be associated with the vertices with which the pixel of the reference image corresponding to the target value is associated.

A cost function or other problem defined in terms of the pixels of the filtered output image could then be mapped onto the vertices according to the association between the pixels of the reference image and the vertices in the vertex space. For example, a cost function comprising a loss term and an affinity term could be mapped onto a linear system of vertex fit values. An illustrative linear system of vertex fit values is:

$$Ay=b$$

where y is a vector of vertex fit values, A is a vertex cost matrix, and b is a vertex cost vector. Once y is determined (e.g., by a preconditioned conjugate gradient method, or by some other method), the association matrix can be used to determine the pixels of the filtered output image based on the determined vertex fit values y.

The vertex cost matrix could be determined based on (1) the association between the pixels of the reference image and the respective vertices associated therewith (e.g., an association matrix S), and (2) a degree of similarity between pairs of pixels of the reference image. The degree of similarity between a particular pair of pixels of the reference image could be related to a distance between the pixel locations of the particular pair of pixels and a distance in a color-space dimension (e.g., a 1-dimensional black-and-white color space, a 3-dimensional RGB color space) between the pixel locations of the particular pair of pixels. Such a degree of similarity could take the form of elements of a pixel affinity matrix as described elsewhere herein.

The vertex cost matrix could be determined by factorizing a pixel affinity matrix of the reference image, based on the association matrix defining the association between the pixels of the reference image and the vertices in the vertex space. An illustrative example is:

$$W=S^T\bar{B}S$$

where W is a pixel affinity matrix whose elements are related to the similarity between pairs of pixels of the reference image, S is the association matrix, and $\bar{B}$ is a vertex affinity matrix. $\bar{B}$ could be determined by factorizing W such that the equation above is approximately equal. Such a factorization could include generating a number of sparse matrices that, multiplied together, result in $\bar{B}$. The vertex cost matrix A could then be determined based on the vertex affinity matrix $\bar{B}$.

As noted above, it can be preferable to solve a problem wherein the pixel affinity matrix is bistochastic. Generating a bistochastic matrix directly from a large non-bistochastic matrix can be computationally costly; instead, the vertex space can be leveraged to simplify the problem. In an example, one or more diagonal matrices could be determined such that, when the association matrix and diagonal matrices are applied to the vertex affinity matrix, a normalized, bistochastic pixel affinity matrix results. The particular forms and methods of determining these diagonal matrices could be chosen to simplify computation of results, to provide an analytically or computationally tractable solution, to simplify the computation of a result based on some reasonable assumptions about the structure of the problem, or according to some other considerations. To illustrate this, the diagonal matrices could be determined such that:

$$\hat{W}=S^T D_m^{-1} D_n \bar{B} D_n D_m^{-1} S$$

where $\hat{W}$ is a bistochastic version of the pixel affinity matrix W, $D_m$ is a first diagonal matrix, and $D_n$ is a second diagonal matrix. The first diagonal matrix, $D_m$, is determined based on row sums of the association matrix:

$$D_m = \text{diag}(S\vec{1})$$

and $D_n$ is determined such that the $\hat{W}$ generated by application of the association matrix and diagonal matrices to the vertex affinity matrix (e.g., as shown above) is bistochastic.

Such a $D_n$ could be determined in a number of ways. One efficient method is to use an iterative method to update an estimate of the diagonal elements of $D_n$ a plurality of times (e.g., until the diagonal elements converge). In a particular example, the method includes determining a first normalizing vector based on row sums of the association matrix, as:

$$m=S\vec{1}$$

where m is the first normalizing vector. A second normalizing vector can then be set to an initial value, e.g.:

$$n=\vec{1}$$

where n is the second normalizing vector. The second normalizing vector is then updated a plurality of times, e.g., until the vector converges or a pre-specified number of times. This update can include taking the square root of each element of a vector that is based on a ratio between (a) an element-wise product of the first normalizing vector and the second normalizing vector, and (b) a product of the vertex affinity matrix and the second normalizing vector, e.g.:

$$n=\sqrt{(n \circ m)/(\bar{B}n)}$$

where ° is the Hadamard product or element-wise multiplication operator. The second diagonal matrix can then be determined from the second normalizing vector, e.g.:

$$D_n=\text{diag}(n)$$

The vertex cost matrix can be determined based on the vertex affinity matrix and the first and second diagonal matrices as, e.g.:

$$A=\lambda(D_m-D_n\bar{B}D_n)+\text{diag}(Sc)$$

where c is a confidence array of confidence values corresponding to respective target values of the target array, t.

In some examples, the equation above could lack the confidence array (e.g., the confidence array could be replaced with a vector of ones).

The vertex cost vector, b, could be determined based on (1) the association between the target values and the vertices and (2) the set of target values. In examples wherein a confidence array, corresponding to the target array, is present, the vertex cost vector could be determined based on an element-wise product of the target array and the confidence array. For example:

$$b = \lambda S(c \circ t)$$

In order to speed the solution of the linear system of vertex fit values, an initial guess for the vertex fit values could be selected to minimize the loss term, e.g.:

$$y_{init} = \frac{S(c \circ t)}{Sc}$$

The number of vertices in the plurality of vertices in the vertex space could be based on one or more properties of a reference image. Further, the location of the plurality of vertices within the vertex space could be specified and/or determined based on the reference image. The locations of the vertices in the vertex space could span a volume in the vertex space that is spanned by the pixels of the reference image. For example, the vertex space could be three-dimensional (e.g., the reference image could be black-and-white) and the vertices could span a volume in the two spatial dimensions of the vertex space corresponding to the extent of the frame of the reference image and in the one-dimensional color-space dimension corresponding to the range of brightness values represented by the pixels of the reference image. For example, the locations of the vertices in the vertex space could span a volume in the vertex space that is spanned by the pixels of the reference image (e.g., three-dimensional vertex space could include vertices that span a volume in two spatial dimensions of the vertex space corresponding to the extent of the frame of the reference image and in a one-dimensional color-space dimension corresponding to the range of brightness values represented by the pixels of the reference image).

The number of vertices in the vertex space could be determined independently of a reference image. For example, a number of vertices could be specified for the performance of the methods described herein for images having a range of resolutions and/or numbers of pixels. The specified number of vertices could be small (e.g., less than 1%) of the number of pixels of reference images used to perform the methods described herein.

Elements of the linear system used to determine vertex fit values, or other information determined from a reference image, could be reused to generate multiple filtered output images. For example, multiple filtered output images, corresponding to the identity of respective different types of object in the reference image, could be generated based on respective different input target arrays and/or confidence arrays (e.g., target arrays containing target values representing whether different pixels of the reference image represent respective different types of object). In another example, a single black-and-white reference image could be colorized according to multiple different target arrays representing respective different specified colors and/or locations of colors in the reference image. This could include concatenating the vertex cost vectors and respective different vertex fit value vectors to solve an overall linear system, e.g.:

$$AY = B$$

where A is the vertex cost matrix (based on at least (1) the association between the vertices and the pixels of the reference image and (2) the degree of similarity between pixels of the reference image), Y is a matrix comprising a concatenation of vertex fit value vectors corresponding to respective different target arrays, and B is a matrix comprising a concatenation of vertex cost vectors corresponding to, and determined based on, the respective different target arrays. The overall linear system could be solved in a variety of ways, e.g., by QR factorization.

V. ALTERNATIVE ERROR FUNCTIONS

The methods described above used a quadratic cost function with respect to the difference between target values of an input target array and corresponding pixels of a generated filtered output image, e.g.:

$$c_i(x_i - t_i)^2$$

However, the methods described herein could be applied to determine filtered output images using alternative cost functions, e.g., as:

$$\rho(x_i - t_i)^2$$

where ρ is a generic cost function (e.g., a robust cost function that is more resilient against outliers than the quadratic cost function). In order to apply the methods described herein to such arbitrary cost functions, a particular initial estimate as to the values of the pixels of the filtered output image could be used to linearize the overall problem (including the generic cost function(s)) about the about the estimate. This linearization could include determining an initial confidence array, based on the initial output image estimate. The method could then be performed, using the initial confidence array, to determine a subsequent estimate of the filtered output image. The overall problem could then be linearized about the subsequent estimate of the filtered output image and the method iterated until the filtered output image converges, until a specified number of such iterations has been performed, or until some other criterion has been satisfied.

VI. BACKPROPAGATION

In some examples, a target array (from which a filtered output image is to be generated, using a reference image) could be determined based on an algorithm or other automated method. For example, the target array could represent information describing objects in the reference image (e.g., semantic segmentation data, categories of objects located in the reference image). Such a target array could be determined, based on the reference image, using a neural net, pattern matching, or some other method.

In such an example, it could be beneficial to compare a filtered output image generated from such a target array to a known 'true' or otherwise desired objective image (e.g., an image that it is preferable that the target array result in). Such an objective image could be, e.g., a human-generated image describing the location and extent of a particular object or type of object within the reference image. Further, it could be beneficial to update, based on a difference between the filtered output image and the objective image, whatever algorithm or process was used to generate the target array. Such an update could require determination of an error gradient or other information about the relationship between error in the filtered output image and errors in particular target values of the target array.

In order to determine such error information about the target array, a difference between the filtered output image and the objective image could be determined and used to generate an updated target array. Such an updated target array could be determined, using backpropagation, based on an association matrix, a vector cost matrix, and the determined difference between the objective image and the filtered output image.

Such a backpropagation could be simplified by computing the derivatives with respect only to the on-diagonal elements of the vector cost matrix. For example, where a loss function, $f(\hat{x})$, is defined with respect to the filtered output image, X, the partial derivative of the target array is:

$$\frac{\partial f}{\partial t} = c \circ \left( S^T \frac{\partial f}{\partial b} \right)$$

and the partial derivative of the confidence array (if present) is:

$$\frac{\partial f}{\partial c} = \left( S^T \frac{\partial f}{\partial \text{diag}(A)} \right) + \left( S^T \frac{\partial f}{\partial b} \right) \circ t$$

where:

$$\frac{\partial f}{\partial b} = A^{-1} \left( s \frac{\partial f}{\partial \hat{x}} \right)$$

and $$\frac{\partial f}{\partial \text{diag}(A)} = -c \frac{\partial f}{\partial b} \circ \hat{y}$$

where $\hat{y}$ is a vector of determined vertex fit values used to generate the pixels of the filtered output image, $\hat{x}$.

VII. EXAMPLE METHODS

Figure 6:
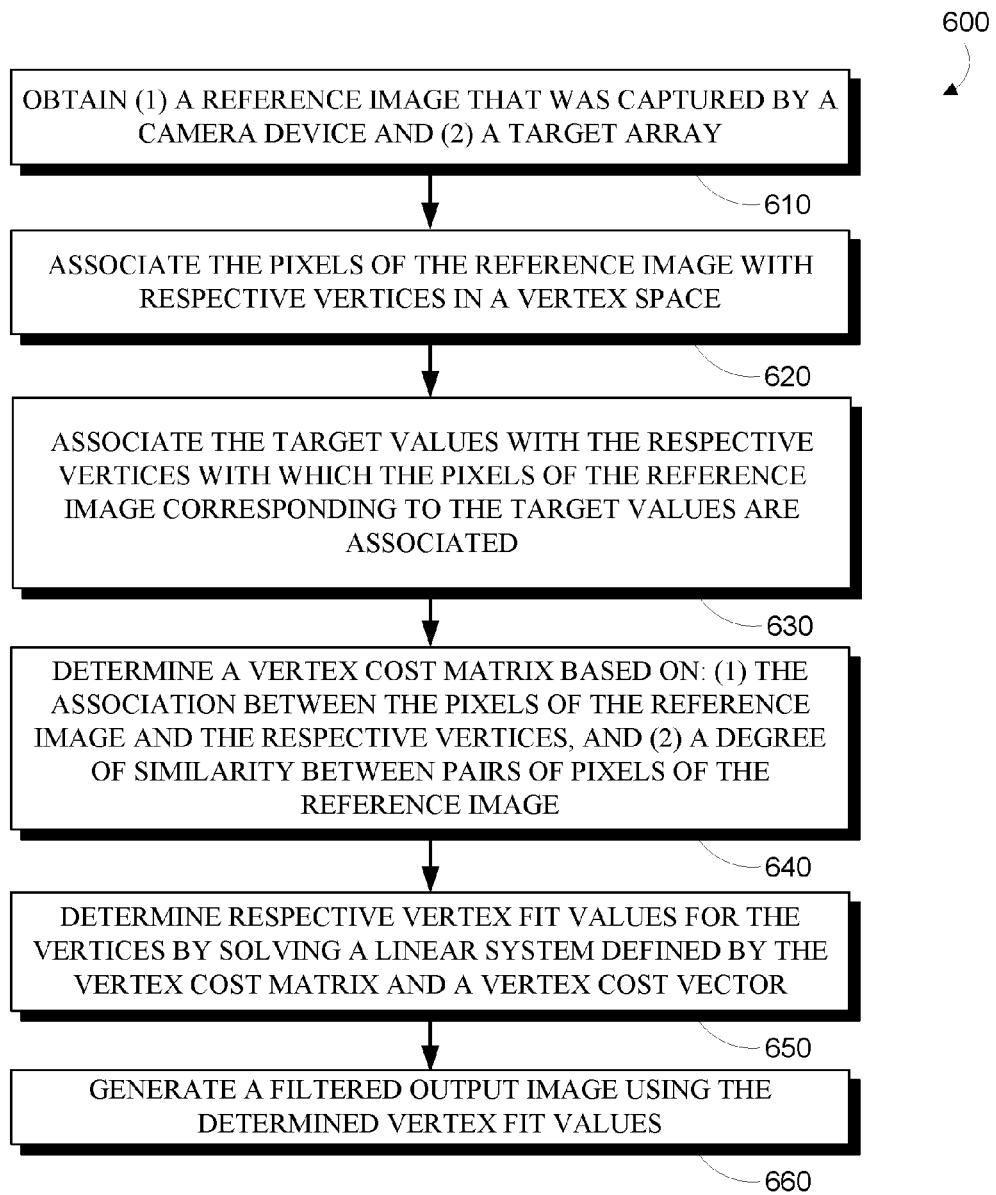
FIG. 6 illustrates an example method.

FIG. 6 is a flowchart illustrating a method 600, according to an example embodiment. Method 600 may be implemented by a device that includes a camera or some other device (including but not limited to camera devices, mobile devices, portable devices, cellphones, laptops, tablet computers, servers, cloud computing systems, robots, drones, self-driving cars, and autonomous vehicles).

Alternatively, method 600 may be implemented by a device or system that is separate from and configured to communicate with such a camera device and/or to access images that are stored in a memory (e.g., a memory card, a compact disc, a hard drive, a cloud storage service, a memory of a remote server (e.g., a server in communication with the internet)). In any case, method 600 may be implemented to generate filtered output images based on input target arrays in an edge-preserving manner relative to one or more reference images.

The method 600 may include obtaining, by a computing system, (1) a reference image that was captured by a camera device and (2) a target array (610). The reference image includes a plurality of pixels that have respective pixel locations in the reference image and respective color variables. The target array includes target values that respectively correspond to the pixels of the reference image.

Obtaining the reference image and/or the target array can include operating first and/or second cameras to capture respective first and/or second images of a scene. Additionally or alternatively, the target array could be generated by an infrared camera, a depth sensor, or some other sensing element(s). Obtaining the reference image and/or the target array can include accessing information from a memory, e.g., from a memory card, a hard drive, a compact disk, or from a remote system (e.g., from a remote server that is accessible over the internet).

Further, obtaining the reference image and/or the target array can include accessing and/or generating images or other information that are not related to a real-world scene. For example, it could include accessing information that was generated by a simulation, computer graphics, or other computational process. Other methods or combinations of methods for generating, capturing, filtering, modifying, or otherwise obtaining the reference image and/or the target array are anticipated.

The method 600 additionally includes associating, by the computing system, the pixels of the reference image with respective vertices in a vertex space (620). The vertex space includes two spatial dimensions and at least one color-space dimension. The association between the pixels of the reference image and the respective vertices is defined by an association matrix that includes a plurality of values of which fewer than half are non-zero. In some examples, fewer than one percent or fewer than one tenth of one percent of the values of the association matrix are non-zero.

Associating each pixel of the reference image with one or more vertices could be based on a proximity or some other relationship within the vertex space between the pixel locations of the pixels and the vertices (e.g., a given pixel could be associated with the nearest vertex within the vertex space, or with a set of vertices (e.g., a set of vertices defining the vertices of a shape in the vertex space that encloses the given pixel location)). The vertex space could have spatial dimensions (e.g., dimensions corresponding to horizontal and vertical dimensions of the reference image) and one or more color-space dimensions (e.g., dimensions corresponding to the brightness, color, red, green, or blue intensity, or other properties of the pixel locations within a color-space).

In some examples, the reference image could be a color image (e.g., could be an image whose pixels define colors in a color-space, e.g., a red-green-blue (RGB color space)) and the vertex space could have two spatial dimensions corresponding to the pixel locations within the frame of the reference image and a further three color-space dimensions corresponding to the location, in the color-space, of colors defined by the plurality of pixels of the reference image. Higher- or lower-dimensional vertex spaces could be used for images whose pixels define more or less color information (e.g., whose pixels define colors in a two-dimensional color-space (e.g., a red-green color-space) or a more than three-dimensional color-space (e.g., a color-space defined to represent the output of detectors of a hyperspectral imager)) or other information (e.g., the direction and/or degree of polarization of light in the image).

The locations of the vertices in the vertex space could span a volume in the vertex space that is spanned by the pixels of the reference image. For example, the vertex space could be three-dimensional (e.g., the first image could be black-and-white) and the vertices could span a volume in the two spatial dimensions of the vertex space corresponding to the extent of the frame of the reference image and in the one-dimensional color-space dimension corresponding to the range of brightness values represented by the pixels of the reference image.

Further, the locations of the vertices in the vertex space could be regularly spaced (e.g., to provide a uniform 'sampling' of the volume of the vertex space corresponding to the reference image). For example, the vertices could be located in the vertex space at the vertices of a tessellated and/or regularly repeating array of three- or more-dimensional shapes or according to some other regular pattern. In some examples, the vertices could be located in a rectangular array (i.e., regularly spaced along orthogonal directions in the multidimensional space, at the vertices of a tessellated array of hyper-rectangles). In some examples, the vertices could be located in a triangular array (i.e., at the vertices of triangles, tetrahedra, or higher-dimensional simplexes that are regularly tessellated in the vertex space).

The method 600 additionally includes associating, by the computing system, the target values with the respective vertices with which the pixels of the reference image corresponding to the target values are associated (630). This could include associating the target values with the vertices according to the association matrix.

The method 600 additionally includes determining, by the computing system, a vertex cost matrix based on: (1) the association between the pixels of the reference image and the respective vertices, and (2) a degree of similarity between pairs of pixels of the reference image (640). The degree of similarity between a particular pair of pixels of the reference image is related to a distance between the pixel locations of the particular pair of pixels in the reference image and a distance in the color-space dimension between the color variables of the particular pair of pixels of the reference image. The vertex cost matrix could be based on a vertex affinity matrix that is, itself, determined based on (1) the association between the pixels of the reference image and the respective vertices and (2) a pixel affinity matrix whose elements are related to the degree of similarity between particular pairs of pixels of the reference image. Such a vertex affinity matrix could be determined by factorizing the pixel affinity matrix, using the association matrix. Determining, by the computing system, a vertex cost matrix could include additional or alternative steps.

The method 600 additionally includes determining, by the computing system, respective vertex fit values for the vertices by solving a linear system defined by the vertex cost matrix and a vertex cost vector (650). This could include performing gradient descent or some other method to solve the linear system. Determining, by the computing system, respective vertex fit values could include determining the vertex cost vector based on (1) the association between the target values and the respective vertices and (2) the set of target values, e.g., by determining an element-wise product of the target array and a confidence array that corresponds to the variance, uncertainty, or other information about the quality of target values of the target array. Determining, by the computing system, respective vertex fit values could include additional or alternative steps.

The method 600 additionally includes generating, by the computing system, a filtered output image (660). The filtered output image includes pixels that respectively correspond to the pixels of the reference image. Generating the filtered output image includes using the determined vertex fit values of vertices that are associated with the pixels of the reference image as a basis to determine respective pixels of the filtered output image. Generating the filtered output image could additionally include performing some additional steps, e.g., applying determined color information of the filtered output image to the reference image in order to generate a colorized version of the reference image. Generating the filtered output image could include additional or alternative steps.

The method 600 could include additional steps or elements in addition to those listed above (e.g., 610, 620, 630, 640, 650, 660). For example, the method 600 could include determining depth information (e.g., pixel depth values for each pixel in the reference image) based on determined disparity values for the pixels in the reference image. As such, the filtered output image may be utilized to generate a depth map of a scene. The depth map may then be used help determine focus settings for the scene, to determine the location of objects in the scene, to map the scene, to navigate the scene (e.g., to operate a robot or other autonomous device to move through the scene) and/or may be used for other purposes. The method 600 could include performing image processing on the reference image based on filtered output image. For example, an image processing process (e.g., a blur, a filtering, an increase or decrease in contrast, a change in a color balance, an application of a color filter) could be performed selectively on regions of the reference image corresponding to objects (i.e., regions of pixels within the reference image) that have determined depth values, colors, object descriptions, or other properties corresponding to a specified range of values.

The method 600 could include other applications or processes based on generated filtered output images. Applications of information (e.g., determined filtered output image pixels and/or vertex fit values) determined using the method 600 include but are not limited to augmented reality (e.g., providing depth cues, assisting in navigation), colorization or filtering of images, semantic segmentation of images, depth super-resolution, or up-sampling of lower-resolution images or other sensor data. Other additional and/or alternative elements and/or applications of method 600 are anticipated

VIII. ILLUSTRATIVE SYSTEMS

Figure 7:
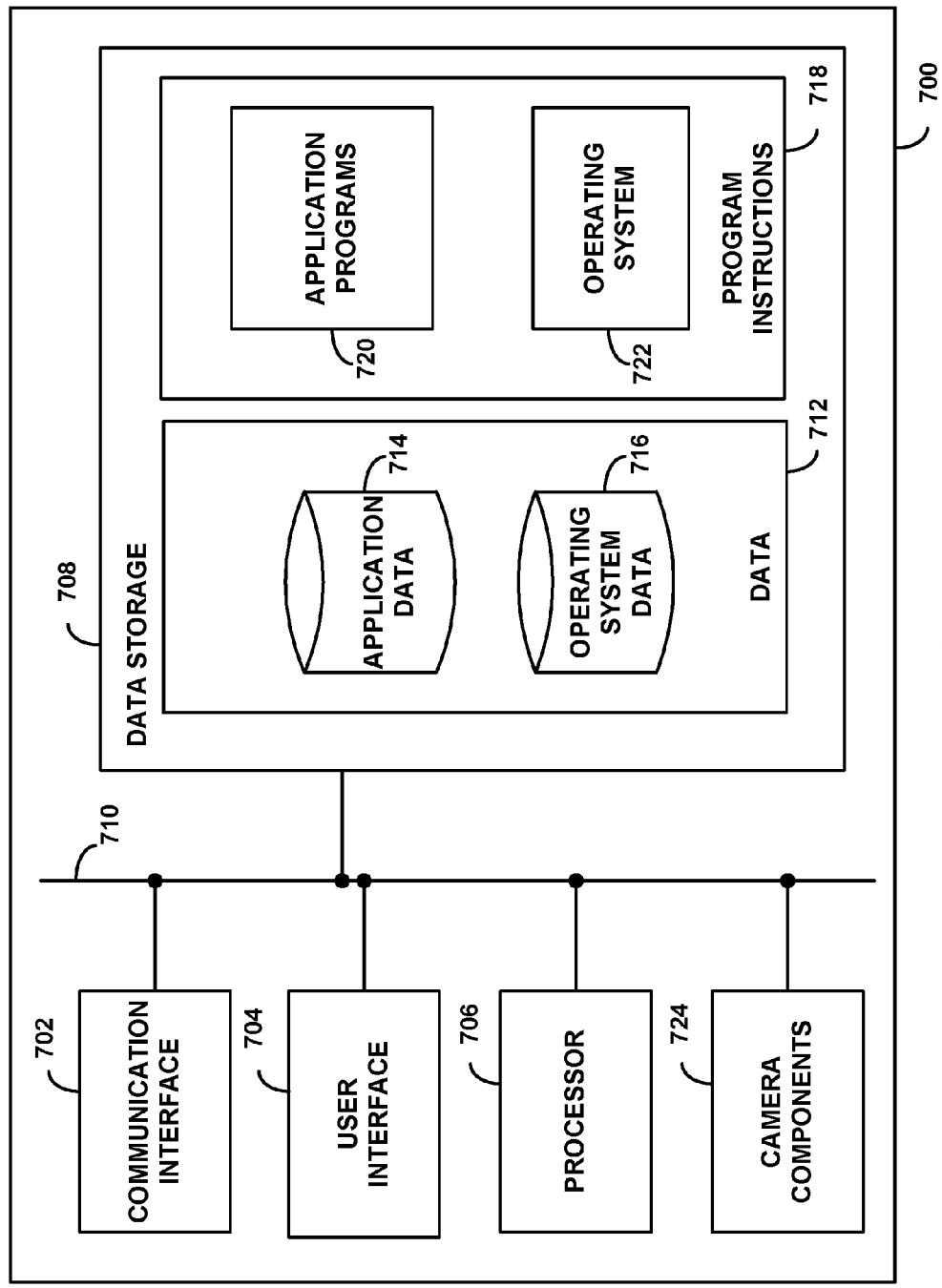
FIG. 7 is a simplified block diagram showing some of the components of an example computing device that may include camera components.

Computational functions (e.g., functions to generate a filtered output image from a target array based on a reference image) described herein may be performed by a computing system. Such a computing system may be integrated into or take the form of a computing device, such as a mobile phone, tablet computer, laptop computer, server, cloud computing network, and/or programmable logic controller. For purposes of example, FIG. 7 is a simplified block diagram showing some of the components of an example computing device 700 that may include camera components 724. Camera components 724 may include multiple cameras, such as visible light cameras, infrared cameras, or other types of cameras.

By way of example and without limitation, computing device 700 may be a cellular mobile telephone (e.g., a smartphone), a still camera, a video camera, a fax machine, a computer (such as a desktop, notebook, tablet, or handheld computer), a personal digital assistant (PDA), a home automation component, a digital video recorder (DVR), a digital television, a remote control, a wearable computing device, a robot, a drone, an autonomous vehicle, or some other type of device that may be equipped with at some image capture and/or image processing capabilities. It should be understood that computing device 700 may represent a physical camera device such as a digital camera, a particular physical hardware platform on which a camera application operates in software, or other combinations of hardware and software that are configured to carry out image capture and/or processing functions.

As shown in FIG. 7, computing device 700 may include a communication interface 702, a user interface 704, a processor 706, data storage 708, and camera components 724, all of which may be communicatively linked together by a system bus, network, or other connection mechanism 710.

Communication interface 702 may function to allow computing device 700 to communicate, using analog or digital modulation of electric, magnetic, electromagnetic, optical, or other signals, with other devices, access networks, and/or transport networks. Thus, communication interface 702 may facilitate circuit-switched and/or packet-switched communication, such as plain old telephone service (POTS) communication and/or Internet protocol (IP) or other packetized communication. For instance, communication interface 702 may include a chipset and antenna arranged for wireless communication with a radio access network or an access point. Also, communication interface 702 may take the form of or include a wireline interface, such as an Ethernet, Universal Serial Bus (USB), or High-Definition Multimedia Interface (HDMI) port. Communication interface 702 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 702. Furthermore, communication interface 702 may comprise multiple physical communication interfaces (e.g., a Wifi interface, a BLUETOOTH® interface, and a wide-area wireless interface).

In some embodiments, communication interface 702 may function to allow computing device 700 to communicate, with other devices, remote servers, access networks, and/or transport networks. For example, the communication interface 702 may function to access reference images, target arrays, and/or confidence arrays via communication with a remote server or other remote device or system in order to allow the computing device 700 to generate filtered output images based on the accessed reference images, confidence arrays, and/or target arrays. For example, the remote system could be a server containing a memory containing one or more reference images and/or target arrays. Additionally or alternatively, the remote system could include cameras, or other image capture devices, configured to generate reference images, target arrays, or other information that could be accessed as described above by computing device 700. Such filtered output images could be generated by the computing device 700 according to the methods described herein or by some other methods.

User interface 704 may function to allow computing device 700 to interact with a user, for example to receive input from and/or to provide output to the user. Thus, user interface 704 may include input components such as a keypad, keyboard, touch-sensitive or presence-sensitive panel, computer mouse, trackball, joystick, microphone, and so on. User interface 704 may also include one or more output components such as a display screen which, for example, may be combined with a presence-sensitive panel. The display screen may be based on CRT, LCD, and/or LED technologies, or other technologies now known or later developed. User interface 704 may also be configured to generate audible output(s), via a speaker, speaker jack, audio output port, audio output device, earphones, and/or other similar devices.

In some embodiments, user interface 704 may include a display that serves as a viewfinder for still camera and/or video camera functions supported by computing device 700 (e.g., for functions of images captured using the camera components 724). Additionally, user interface 704 may include one or more buttons, switches, knobs, and/or dials that facilitate the configuration and focusing of the camera components 724 and the capturing of images using the camera components 724. It may be possible that some or all of these buttons, switches, knobs, and/or dials are implemented as functions on a touch- or presence-sensitive panel. User interface 704 may be configured to permit a user to input target array information, e.g., to manually specify the color of areas of a reference image.

Processor 706 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other applications or functions. Data storage 708 may include one or more volatile and/or non-volatile storage components, such as magnetic, optical, flash, or organic storage, and may be integrated in whole or in part with processor 706. Data storage 708 may include removable and/or non-removable components.

Processor 706 may be capable of executing program instructions 718 (e.g., compiled or non-compiled program logic and/or machine code) stored in data storage 708 to carry out the various functions described herein. Therefore, data storage 708 may include a non-transitory computer-readable medium, having stored thereon program instructions that, upon execution by computing device 700, cause computing device 700 to carry out any of the methods, processes, or functions disclosed in this specification and/or the accompanying drawings. The execution of program instructions 718 by processor 706 may result in processor 706 using data 712.

By way of example, program instructions 718 may include an operating system 722 (e.g., an operating system kernel, device driver(s), and/or other modules) and one or more application programs 720 (e.g., camera functions, address book, email, web browsing, social networking, and/or gaming applications) installed on computing device 700. Similarly, data 712 may include operating system data 716 and application data 714. Operating system data 716 may be accessible primarily to operating system 722, and application data 714 may be accessible primarily to one or more of application programs 720. Application data 714 may be arranged in a file system that is visible to or hidden from a user of computing device 700.

Application programs 720 may communicate with operating system 722 through one or more application programming interfaces (APIs). These APIs may facilitate, for instance, application programs 720 reading and/or writing application data 714, transmitting or receiving information via communication interface 702, receiving and/or displaying information on user interface 704, capturing images using camera components 724, and so on.

The determination of filtered output images from reference images and/or target arrays captured by cameras (i.e., from stereo image pairs captured by, e.g., camera components 724) or generated by some other means (e.g., image processing, virtual reality, computer-generated images, augmented reality, depth sensors) and/or determination of other information based on such filtered output images could be performed by one or more components of the processor 706 (e.g., by one or more digital signal processors (DSPs), graphics processing units (GPUs), central processing units (CPUs), floating point units (FPUs), application-specific integrated circuits (ASICs), some other type of computational component, and/or some combination of one or more types of computational components, of the processor 706). For example, certain operations related to determination of pixels of a filtered output image (e.g., matrix multiplication, determination of pixel values based on determined vertex fit values) could be performed by a first computational element or type of computational element (e.g., DSPs, GPUs) of the processor 706 and other certain operations related to determination of vertex fit values (e.g., step size optimization during a gradient descent operation to solve a linear system) could be performed by a second computational element or type of computational element (e.g., a general-purpose CPU) of the processor 706.

Application programs 720 may take the form of "apps" that could be downloadable to computing device 700 through one or more online application stores or application markets (via, e.g., the communication interface 702). However, application programs can also be installed on computing device 700 in other ways, such as via a web browser or through a physical interface (e.g., a USB port) of the computing device 700.

Camera components 724 may include, but are not limited to, an aperture, shutter, recording surface (e.g., photographic film and/or an image sensor), lens, and/or shutter. Camera components 724 may be controlled at least in part by software executed by processor 706 (e.g., by application programs 720). Further, camera components 724 may include multiple camera systems, which each camera system includes a respective aperture, shutter, recording surface, lens, image sensor, processor, and/or other elements.

When multiple camera systems are included, there may be some components that are shared between the systems, and other components that are not shared. For example, each camera could include its own aperture, lens, and image sensor, while sharing other components such as a processor, a data bus, and/or a shutter button. As another example, each camera could include its own lens, but share the same image sensor. Alternatively, an individual camera system's components may be utilized only for that individual camera system, and not shared with other camera systems.

IX. EXPERIMENTAL RESULTS

The methods described herein may be implemented, as an alternative to or in addition to other methods, in order to filter, upsample, colorize, or otherwise process input data (e.g., a target array) to generate output images in an edge-preserving manner based on reference images. The methods described herein are, in many circumstances, superior to other methods with respect to compute time, memory requirements, or other considerations. Further, while certain alternative methods may be context-dependent (e.g., adapted specifically to process images representing certain types of scenes or contents), the methods described herein are relatively agnostic to the specifics of reference images and/or target arrays to which the methods may be applied. Thus, the methods described herein represent an improvement to computers and computer-related technology in the field of image processing.

The methods herein may be used to upsample noisy depth maps generated using consumer-grade depth sensors. The methods described herein generally improve the quality, relative to other state-of-the-art methods, of super-resolved depth maps generated based on depth sensor outputs. The methods described herein also generally significantly reduce the compute time necessary to generate such increased-resolution depth maps, as illustrated below.

| Method | Error (geometric mean of RMSE over the dataset) | Time (sec) |
| --- | --- | --- |
| Keichle et al. | 5.86 | 450 |
| Chan et al. | 3.83 | 3.02 |
| He et al. | 3.76 | 23.89 |
| Lu & Forsythe | 3.69 | 20 |
| Park et al. | 3.61 | 24.05 |
| Domain Transform | 3.56 | 0.021 |
| Joint Bilateral Upsample | 3.14 | 1.98 |
| Ferstl et al. | 2.93 | 140 |
| Li et al. | 2.56 | 700 |
| Kwon et al. | 1.21 | 300 |
| Methods Described Herein | 2.70 | 0.33 |

The methods described herein may be used to colorize a reference image based on a small amount of user input or other outside information. The methods described herein generate colorized images of similar quality to images generated using the method of Levin et al. However, the methods described herein significantly reduce the compute time necessary to generate such colorized images, taking 0.854 seconds per megapixel while Leven et al. requires 80.99 seconds per megapixel.

The methods described herein may be used to assign a category label (e.g., to perform a semantic segmentation task) or to otherwise generate information describing objects in a reference image for each pixel of the reference image. Such a determination may be based on input data (e.g., a target array) that describes objects in the reference image at a small number of locations or pixels of the reference image (e.g., at a lower resolution than the reference image) and/or that describes objects in the reference image for every pixel of the reference image but in a manner that is noisy, uncertain, or otherwise low-quality (e.g., in a manner that is smooth and blurred across image boundaries).

The methods described herein generated discrete segmentation images that were smoother than and approximately as accurate as those generated by other methods; further, the methods described herein were significantly faster than the other methods to which they were compared, as illustrated below. The methods used to generate the input data included the deep convolutional neural network of the DeepLab system of Chen et al. and the convolutional neural network component of the conditional random field-recurrent neural network (CRF-RNN) system of Zheng et al. The methods used herein were compared, in the task of filtering the output of such segmentation algorithms, with the conditional random field (CRF) method for post processing such semantic outputs. "CNN+Methods Herein," below, refers to applying the methods described herein to the output of the convolutional neural network component of the CRF-RNN system of Zheng et al.

| Method | Intersection-over-Union % | Input generation time (ms) | Postprocessing time (ms) | Total time (ms) |
|---|---|---|---|---|
| DeepLab + CRF | 67.64% | 58 | 918 | 976 |
| DeepLab + Methods Herein | 66.00% | 58 | 111 | 169 |
| CRF-RNN | 72.96% | 715 | 2214 | 2929 |
| CNN + Methods Herein | 70.68 | 715 | 217 | 913 |

X. CONCLUSION

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flowcharts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

We claim:

1. A method comprising:

obtaining, by a computing system, (1) a reference image that was captured by a camera device and (2) a target array, wherein the reference image comprises a plurality of pixels that have respective pixel locations in the reference image and respective color variables, wherein the target array comprises target values, and wherein the target values respectively correspond to the pixels of the reference image;

associating, by the computing system, the pixels of the reference image with respective vertices in a vertex space, wherein the vertex space comprises two spatial dimensions and a color-space dimension, wherein the association between the pixels of the reference image and the respective vertices is defined by an association matrix, wherein the association matrix comprises a plurality of values of which fewer than half are non-zero;

associating, by the computing system, the target values with the respective vertices with which the pixels of the reference image corresponding to the target values are associated;

determining, by the computing system, a vertex cost matrix based on: (1) the association between the pixels of the reference image and the respective vertices, and (2) a degree of similarity between pairs of pixels of the reference image, wherein the degree of similarity between a particular pair of pixels of the reference image is related to a distance between the pixel locations of the particular pair of pixels in the reference image and a distance in the color-space dimension between the color variables of the particular pair of pixels of the reference image;

determining, by the computing system, respective vertex fit values for the vertices by solving a linear system defined by the vertex cost matrix and a vertex cost vector; and generating, by the computing system, a filtered output image, wherein the filtered output image comprises pixels that respectively correspond to the pixels of the reference image, wherein generating the filtered output image comprises using the determined vertex fit values of vertices that are associated with the pixels of the reference image as a basis to determine respective pixels of the filtered output image.

2. The method of claim 1, wherein determining the vertex cost matrix comprises:

determining a pixel affinity matrix, wherein the pixel affinity matrix comprises a plurality of values, wherein the values of the pixel affinity matrix respectively correspond to the degrees of similarity between pairs of pixels of the reference image; and determining a vertex affinity matrix, wherein determining the vertex affinity matrix comprises using the association matrix to factorize the pixel affinity matrix; and determining the vertex cost matrix based on the vertex affinity matrix.

3. The method of claim 2, wherein determining the vertex cost matrix further comprises:

determining a first diagonal matrix based on row sums of the association matrix; and determining a second diagonal matrix such that application of the association matrix, first diagonal matrix, and second diagonal matrix to the vertex affinity matrix results in a normalized pixel affinity matrix that is bistochastic; and generating the vertex cost matrix based on the vertex affinity matrix, the first diagonal matrix, and the second diagonal matrix.

4. The method of claim 3, wherein determining the second diagonal matrix comprises:

determining a first normalizing vector based on row sums of the association matrix;

updating a second normalizing vector a plurality of times, wherein updating the second normalizing vector comprises taking the square root of each element of a vector that is based on a ratio between (a) an element-wise product of the first normalizing vector and the second normalizing vector, and (b) a product of the vertex affinity matrix and the second normalizing vector; and determining the second diagonal matrix based on the second normalizing vector.

5. The method of claim 1, further comprising:

determining the vertex cost vector based on: (1) the association between the target values and the respective vertices and (2) the set of target values.

6. The method of claim 1, wherein the target array comprises as many target values as the number of pixels in the reference image, and further comprising:

obtaining a confidence array, wherein the confidence array comprises confidence values that respectively correspond to the target values of the target array; and generating the vertex cost vector based on an element-wise product of the target array and the confidence array.

7. The method of claim 6, further comprising:

determining a second confidence array, wherein the second confidence array comprises confidence values that respectively correspond to the target values of the target array, wherein determining confidence values of the second confidence array comprises applying respective cost functions to respective differences between pixels of the filtered output image and target values of the target array;

determining a second vertex cost matrix based on: (1) the association between the pixels of the reference image and the respective vertices, (2) the degree of similarity between pairs of pixels of the reference image, and (3) the second confidence array;

determining a second vertex cost vector based on: (1) the association between the target values and the respective vertices and (2) an element-wise product of the target array and the second confidence array;

determining respective second vertex fit values for the vertices by solving a linear system defined by the second vertex cost matrix and the second vertex cost vector; and generating a second filtered output image, wherein the second filtered output image comprises pixels that respectively correspond to the pixels of the reference image, wherein generating the second filtered output image comprises using the determined second vertex fit values of vertices that are associated with the pixels of the reference image as a basis to determine respective pixels of the second filtered output image.

8. The method of claim 1, wherein the target array comprises fewer target values than a number of pixels in the reference image, wherein the target values of the target array represent colors of regions of the reference image, and wherein generating a filtered output image comprises generating a colorized version of the reference image.

9. The method of claim 1, wherein the target array comprises fewer target values than a number of pixels in the reference image, wherein the target values of the target array describe objects that are represented by respective pixels of the reference image, and wherein generating a filtered output image comprises generating an image describing the extent and location of objects represented in the reference image.

10. The method of claim 1, wherein the target array comprises fewer target values than a number of pixels in the reference image, wherein the target values of the target array represent a target image with a lower resolution than the reference image, and wherein generating a filtered output image comprises generating an upsampled version of the target image.

11. The method of claim 1, wherein the target values of the target array represent distances between the camera that captured the reference image and objects that are represented by respective pixels of the reference image, and wherein generating a filtered output image comprises generating distances between the camera that captured the reference image and objects that are represented by respective pixels of the reference image.

12. The method of claim 1, wherein associating the pixels of the reference image with respective vertices in a vertex space comprises determining which of the vertices is more proximate in the vertex space to a particular pixel of the reference image than any of the other vertices.

13. The method of claim 1, further comprising:

determining a difference between the filtered output image and an objective image, wherein the objective image comprises pixels that respectively correspond to the pixels of the filtered output image; and generating an updated target array, wherein the updated target array comprises updated target values, and wherein the updated target values respectively correspond to the target values of the target array, wherein generating the updated target array comprises using backpropagation to determine the updated target array based on the association matrix, the vertex cost matrix, and a difference between the filtered output image and the objective image.

14. A non-transitory computer readable medium having stored therein instructions executable by a computing system to cause the computing system to perform operations comprising:

obtaining (1) a reference image that was captured by a camera device and (2) a target array, wherein the reference image comprises a plurality of pixels that have respective pixel locations in the reference image and respective color variables, wherein the target array comprises target values, and wherein the target values respectively correspond to the pixels of the reference image;

associating the pixels of the reference image with respective vertices in a vertex space, wherein the vertex space comprises two spatial dimensions and a color-space dimension, wherein the association between the pixels of the reference image and the respective vertices is defined by an association matrix, wherein the association matrix comprises a plurality of values of which fewer than half are non-zero;

associating the target values with the respective vertices with which the pixels of the reference image corresponding to the target values are associated;

determining a vertex cost matrix based on: (1) the association between the pixels of the reference image and the respective vertices, and (2) a degree of similarity between pairs of pixels of the reference image, wherein the degree of similarity between a particular pair of pixels of the reference image is related to a distance between the pixel locations of the particular pair of pixels in the reference image and a distance in the color-space dimension between the color variables of the particular pair of pixels of the reference image;

determining respective vertex fit values for the vertices by solving a linear system defined by the vertex cost matrix and a vertex cost vector; and generating a filtered output image, wherein the filtered output image comprises pixels that respectively correspond to the pixels of the reference image, wherein generating the filtered output image comprises using the determined vertex fit values of vertices that are associated with the pixels of the reference image as a basis to determine respective pixels of the filtered output image.

15. The non-transitory computer readable medium of claim 14, wherein determining the vertex cost matrix comprises:

determining a pixel affinity matrix, wherein the pixel affinity matrix comprises a plurality of values, wherein the values of the pixel affinity matrix respectively correspond to the degrees of similarity between pairs of pixels of the reference image; and determining a vertex affinity matrix, wherein determining the vertex affinity matrix comprises using the association matrix to factorize the pixel affinity matrix; and determining the vertex cost matrix based on the vertex affinity matrix.

16. The non-transitory computer readable medium of claim 15, wherein determining the vertex cost matrix further comprises:

determining a first diagonal matrix based on row sums of the association matrix; and determining a second diagonal matrix such that application of the association matrix, first diagonal matrix, and second diagonal matrix to the vertex affinity matrix results in a normalized pixel affinity matrix, wherein the normalized pixel affinity matrix is a bistochastic matrix; and generating the vertex cost matrix based on the vertex affinity matrix, the first diagonal matrix, and the second diagonal matrix.

17. The non-transitory computer readable medium of claim 16, wherein determining the second diagonal matrix comprises:

determining a first normalizing vector based on row sums of the association matrix;

updating a second normalizing vector a plurality of times, wherein updating the second normalizing vector comprises taking the square root of each element of a vector that is based on a ratio between (a) an element-wise product of the first normalizing vector and the second normalizing vector, and (b) a product of the vertex affinity matrix and the second normalizing vector; and determining the second diagonal matrix based on the second normalizing vector.

18. The non-transitory computer readable medium of claim 14, wherein the operations further comprise:

determining the vertex cost vector based on: (1) the association between the target values and the respective vertices and (2) the set of target values.

19. The non-transitory computer readable medium of claim 14, wherein the target array comprises as many target values as the number of pixels in the reference image, and wherein the operations further comprise:

obtaining a confidence array, wherein the confidence array comprises confidence values, and wherein the confidence values respectively correspond to the target values of the target array; and generating the vertex cost vector based on an element-wise product of the target array and the confidence array.

20. The non-transitory computer readable medium of claim 14, wherein the target array comprises fewer target values than a number of pixels in the reference image, wherein the target values of the target array represent a target image with a lower resolution than the reference image, and wherein generating a filtered output image comprises generating an upsampled version of the target image.

* * * * *